United States Patent
Charnock et al.

(10) Patent No.: US 11,594,012 B2
(45) Date of Patent: Feb. 28, 2023

(54) SYSTEM AND METHOD FOR DETECTING AND ANALYZING DIGITAL COMMUNICATIONS

(71) Applicant: Chenope, Inc., Half Moon Bay, CA (US)

(72) Inventors: Elizabeth B. Charnock, Half Moon Bay, CA (US); Steven L. Roberts, Half Moon Bay, CA (US)

(73) Assignee: Chenope, Inc., Half Moon Bay, CA (US)

( * ) Notice: Subject to any disclaimer, the term of this patent is extended or adjusted under 35 U.S.C. 154(b) by 224 days.

(21) Appl. No.: 16/576,736

(22) Filed: Sep. 19, 2019

(65) Prior Publication Data
US 2021/0174128 A1    Jun. 10, 2021

Related U.S. Application Data

(60) Provisional application No. 62/733,109, filed on Sep. 19, 2018.

(51) Int. Cl.
*G06N 3/08* (2023.01)
*G06K 9/62* (2022.01)
(Continued)

(52) U.S. Cl.
CPC ......... *G06V 10/751* (2022.01); *G06K 9/6218* (2013.01); *G06N 3/08* (2013.01); *G06N 5/04* (2013.01); *G06V 10/255* (2022.01)

(58) Field of Classification Search
USPC ............ 706/12, 45–46; 726/23–26; 382/155, 382/225
See application file for complete search history.

(56) References Cited

U.S. PATENT DOCUMENTS 7,373,666 B2 *  5/2008  Kaier ................... G06F 21/554
                                                709/224
7,891,003 B2 *  2/2011  Mir ....................... G06Q 10/06
                                                 726/25

(Continued)

OTHER PUBLICATIONS

Wadhwa et al., Tracking On-line Radicalization Using Investigative Data Mining, 2013 IEEE 978-1-4673-5952-8/13, pp. 1-5. (Year: 2013).*

*Primary Examiner* — Ishrat I Sherali
(74) *Attorney, Agent, or Firm* — Procopio, Cory, Hargreaves & Savitch LLP

(57) ABSTRACT

A computer readable medium for analyzing images according to specific kinds of features oriented towards detecting subtle branding features (intentional or otherwise) rather than relying on the usual image similarity detection methods. Also disclosed are steps to enhance standard machine learning techniques to identify new types of transformations by partitioning data into measure-countermeasure windows, which may be either/both detected computationally or inputted into a knowledgebase. The invention further incorporates direct and indirect traits of images that were likely to have been promulgated by a particular group or actor of interest, especially those traits that prove to be more invariant over time (including the use of transformations) which have proven to be more resistant to countermeasures applied in different jurisdictions. More generally, almost all embodiments allow individual feature calculations to be toggled on and off, and to define sets of features according to jurisdiction.

15 Claims, 15 Drawing Sheets

(51) Int. Cl.
*G06V 10/75* (2022.01)
*G06N 5/04* (2023.01)
*G06V 10/20* (2022.01)

(56) References Cited

U.S. PATENT DOCUMENTS

| | | | | |
|---|---|---|---|---|
| 8,838,834 | B2* | 9/2014 | Reynolds | G06Q 50/265 |
| | | | | 709/224 |
| 8,887,286 | B2* | 11/2014 | Dupont | G06F 21/50 |
| | | | | 726/25 |
| 9,043,257 | B1* | 5/2015 | Brown | G06N 5/02 |
| | | | | 706/45 |
| 9,569,729 | B1* | 2/2017 | Oehrle | G06Q 10/063 |
| 11,089,034 | B2* | 8/2021 | Dichiu | G06F 21/552 |
| 2004/0003286 | A1* | 1/2004 | Kaler et al. | G06F 21/554 |
| | | | | 726/25 |
| 2006/0271526 | A1* | 11/2006 | Charnock | G06Q 30/02 |
| 2012/0137367 | A1* | 5/2012 | Dupont | G06F 21/00 |
| | | | | 726/25 |
| 2014/0096249 | A1* | 4/2014 | Dupont | G06F 21/00 |
| | | | | 726/23 |
| 2017/0193333 | A1* | 7/2017 | Cavalin | G06K 9/6215 |
| 2021/0174128 | A1* | 6/2021 | Charnock | G06V 10/751 |
| 2022/0164643 | A1* | 5/2022 | Charnock | G06N 5/046 |

* cited by examiner

Figure 12  Example of Measure / Countermeasure Pairs

Figure 13 Sample Partial Multigraph - No Evidence Type[39000] Filtering

SYSTEM AND METHOD FOR DETECTING AND ANALYZING DIGITAL COMMUNICATIONS

CROSS-REFERENCE TO RELATED APPLICATIONS

This application claims the benefit of U.S. Application 62/733,109.

BACKGROUND OF THE INVENTION

Symbols send powerful messages, both direct and subconscious. As the Internet has become more and more awash in propaganda, political content, and social commentary, the methods for generating and manipulating images have grown greatly in sophistication. It thus becomes increasingly valuable to understand and track how exactly such content is created and transformed by its distributors. This is especially true in the case of highly tech-savvy actors creating and disseminating content so as to deliberately game current content monitoring systems, while still consistently delivering the intended message to real people. The invention described here augments existing approaches to more correctly and quickly identify the intent of digitally disseminated images—even if those images are modified by human operators hoping to disguise their intent to those very same systems.

State and other types of sophisticated actors (such as terrorist groups) wish to reuse specific (and effective) visual elements in their propaganda campaigns, even though they must frequently inject some variety, both to keep things interesting and to try to evade detection. Thus whatever key properties made the initial image appealing enough to reuse are very likely to be retained for as long as possible—at least in some form. Assuming this is the case, in an abstract sense the same image component(s) are being distributed, rather than N many images that share a large number of features in common. As we will demonstrate, this assumption enables a new computational approach.

We will assert that what is actually important to track and analyze are image components and that the container image itself is of lesser importance. There are two high level types of image components. Direct image components (DIC's) are images or objects inserted in other images in some clear way while logical image components (LIC's) are transformations of different kinds that relate different images that may be subtle and/or unexpected in nature.

While there has been much work with various machine learning approaches to identify specific direct image features of interest (such as beheadings used by terrorists to demoralize opponents and encourage their followers), such techniques fail to take into account the inevitable need for the actors who post such content to respond to countermeasures designed to detect and deter the spread of these messages. With current technology, even the best feature detector will only be useful for a limited time. Indeed, the better it works the less long it will last. Those posting objectionable content quickly become aware of these countermeasures since these usually take the form of blocking, de-platforming, or some type of law enforcement action. They are very likely to decide to switch to other imagery, or at least take some kind of evasive action.

Further, currently many machine learning approaches that effectively target specific ancillary traits such as an unusual choice of font aren't likely to work well when content providers make simple yet effective changes to their propaganda, such as when they switch to a different font/background combination that likewise has a low OCR-ability co-efficient. Otherwise put, the bad actors are looking to optimize for a specific result, while ML approaches focus on detecting specific features.

The difficulty is that there's often not a clear or unique mapping between features and results. For example, there are many different methods of making OCR'ing text embedded in an image more error-prone and difficult, and they don't all involve use of the same or similar features. And a feature that is obfuscating in some contexts may not be in others, and/or may simply be artistic license, especially in the case of what is known as text-as-art or art-as-text. This problem is further exacerbated by the fact that the amount of data in question in such scenarios generally does not rise to the definition of "big data", or often anywhere close.

We will refer to the "results"—that is computable or derivable features as "indirect" features. We propose that many of these indirect features are likely to be more persistent than direct ones, since producing images with such derived characteristics wouldn't by itself be proof positive of anything, may require some computational sophistication to detect, and because there is significant motivation for the promulgators to keep using the technique or imagery so long as it remains at all viable.

However, often such persistence will involve significant transformation of the prior object or technique. In other words, any kind of recognizable reference to a lion on any kind of media is still nonetheless a lion, and will generally be understood as such by the target audience. (And at any rate, there is rarely a canonical "lion" even initially. It is rather a concept that is being symbolically conveyed.) Many such transformations are machine-learnable, especially if assisted by supervised learning, even without the usual very large amounts of data being available. As with anything else, transformations that prove successful once are likely to be reused.

We propose to analyze images according to specific kinds of features oriented towards detecting subtle branding features (intentional or otherwise) rather than relying on the usual image similarity detection methods. We further propose to enhance standard machine learning techniques in order to help identify new types of transformations by partitioning data into measure→countermeasure windows, which may be either/both detected computationally or inputted into a knowledgebase. This is important to do since such transformations are likely to mostly occur in reaction to a countermeasure. And because the initiation of each new window reduces the ability to correctly predict the future based on the past.

SUMMARY OF THE INVENTION

The digital images that appear on social media and on other online forums have features that are often overlooked from an analytical point of view. These include, but are not limited to: font characteristics (in images which contain some kind of embedded text), composited logos or other "signature" elements, overlay of textual or other visual elements in a specific location, use of very specific color palettes, method of creating a "montage" of distinct subimages, or the inclusion of certain objects or historical references whose representation can range from the very abstract to the very literal.

As an example of the use of visual symbolism, ISIS had once had the convention of inserting visual references to lions somewhere in their images. These were sometimes photographs of actual lions—or of statues of lions—but also sometimes images of ancient calligraphy of lions, or very abstract modern representations of a lion. However, once the inclusion of a lion became understood as a signal of an ISIS image by law enforcement and intelligence agencies in a given country, the lion references started to disappear—or at least to transform. They were too easy to identify with ML techniques; human analysts viewing images would also quickly come to make the association. Obvious images of beheadings on public forums also became much less common for the same reason.

Such bad actor responses to countermeasures are nearly inevitable. Nonetheless, the groups who create such propaganda images will not cease to create or distribute their images no matter how many diverse countermeasures are applied. They still wish their target audience to be able to identify their content with a minimum of difficulty. This means that it is likely that at least some traits of the images produced by these groups will remain relatively constant—or at least transform within predictable/learnable ways—across at least a meaningful subset of their images within some window of time subsequent to the implementation of a countermeasure.

Images also offer a handy way of creating a protective shell around text that the group does not wish to have easily noticed or intercepted by law enforcement authorities. For example, text in a non-standard font that is very thin and curvy in a color that has low contrast with a complex background and which contains more than one language is likely to result in text that is difficult (or worse) to OCR—if anyone is even bothering to try to OCR it. However, a person who recognizes the particular font—and/or other aspects of the image as familiar—and so becomes interested in it will nonetheless be able to read the text if he places his visual focus on it and makes a slight effort.

Meta-data, both direct and derived that is associated either with a particular image instance or with posting(s) that involve or relate to the image, or of any of the associated image components, also can offer significant clues as to the intended meaning of the image. This is especially important in cases in which portions of the content of the image are very similar to a large number of images of unrelated provenance, and so would otherwise likely be overlooked amidst the sea of similar images.

Furthermore, the same image or DIC can end up being used for entirely opposite purposes under some conditions. For example, a particularly spectacular photo of the Twin Towers tumbling on 9/11 might turn up as a DIC used by terrorists as well as by people wishing to memorialize the victims or the heroic firemen. In such a case, the social context of the poster and of the post, as well as other image components present in the container image (if any) must be used to disambiguate the sentiment or pragmatic intent.

Additionally, posted images have dynamic features related to the characteristics of their transmission by time window; in most embodiments, user-configured rolling time windows starting from the time of the first identifiable post of the image or DIC. By "characteristics" we do not mean simple tallies of "likes", retweets or similar, but rather more complex assessments including but not limited to whether it was transmitted to the group, mostly within the usual graph neighborhood of the particular poster, or more between very loosely connected individuals based on presence in a given forum. Such transmission characteristics can be quite telling about what the image (or other content) actually signifies. For example, coordinated propaganda or disinformation distribution can often be identified by the fact that the graph of initial propagation always involves suspiciously similar—or even the very same—accounts.

Most embodiments will create a multipart UID based on these static features with the aim of identifying related images. Most embodiments will also use these different static and dynamic features as evidence types that can be utilized in a hypergraph or multigraph that, amongst other things, will effectively enable "negative evidence" links to prune the graph in cases such as the above-mentioned 9/11 one in which theoretically the same initial image may fork off entirely unrelated descent trees. In other words, even if no aspect of the image itself is intentionally or unintentionally altered in any way whatsoever, logically (for example) its distribution among terrorist groups will be treated as totally distinct from law enforcement groups passing it around.

The focus of the invention is on the set of both direct and indirect traits of images that were likely to have been promulgated by a particular group or actor of interest, especially those traits that prove to be more invariant over time (including the use of transformations), that is, which have proven to be more resistant to countermeasures applied in different jurisdictions. These will often be features that are in themselves totally innocuous, (for example the choice of an obscure font, or a particular combination of languages embedded in the image) and/or which will not uniquely identify the image as belonging to a terrorist group or other bad actor (for example, Koran citations.) Most embodiments will permit separate scores to be calculated for direct vs. indirect features. More generally, almost all embodiments allow individual feature calculations to be toggled on and off, and to define sets of features according to jurisdiction; different laws exist in different countries that govern religious speech for example.

As will be seen in the following sections, this approach is significantly more work computationally than just flagging a particular visual element such as a lion, because it involves the derivation of a number of traits some of which may be non-trivial. However it is also a far more robust and realistic approach as well, one that would ultimately make it far more difficult for terrorists and other bad actors to even subtly brand their images in a coherent manner without inviting detection, to repeat the use of techniques that they have found to be effective, or to use evasive methods such as the embedding of deliberately difficult to OCR text.

The sentiments expressed in relation to an image (or image family) by the actors who engage in some way with it can also provide quite useful context in many use cases. If the old maxim about a picture being worth a thousand words were always true, today it is also true that images offer a safer—and less immediately detectable—means of conveying sentiments that may be dangerous to express openly. The fact that such expressions of sentiment may no longer be fit for transmission in open text on public forums means that sentiment analysis involving images is now a trickier proposition; in the worst case, there simply won't be any text in the post along with (or accompanying) the image. Other means must therefore be introduced in order to assess the (possibly implicit) sentiment or pragmatic intent of the poster(s) of an image towards it, and what it represents. It should be noted that sentiment detection of either any persons appearing in an image, or how a "normal" person in a given population might perceive an image are separate problems from this. We are concerned with sentiment(s) that are attributed to an image by the specific people who are posting, commenting, or otherwise performing some action in relation to the image.

Another practical innovation in the system described herein is the automated tailoring of analytical results to a form that is acceptable for the given jurisdiction. For example, if a chain of evidence that has links based on 'possibly' or on black box and/or potentially unstable output is legally problematic in a given jurisdiction, its results can be eliminated from the model as required by the laws of that jurisdiction.

For purposes of brevity, the definition of "image" in this document is intended to extend to videos, insofar as videos are composed of a large series of sequential images. Properties of the transitions between subsequent frames may provide additional types of evidence.

Finally, it should be noted that the approach described in this document can equally be used for offensive purposes, for example to identify the countermeasures of an adversary. Likewise it should be noted that although this document is focused on image analysis, the need for apples-to-apples data sets that are bounded by windows of measure and countermeasure—and so the basic system design that is described in this document—apply to any type of data that is transmitted through anything that is mappable to a social network, or network of human users.

DETAILED DESCRIPTION OF THE INVENTION

System[100] Overview—a Sample Embodiment

Figure 1:
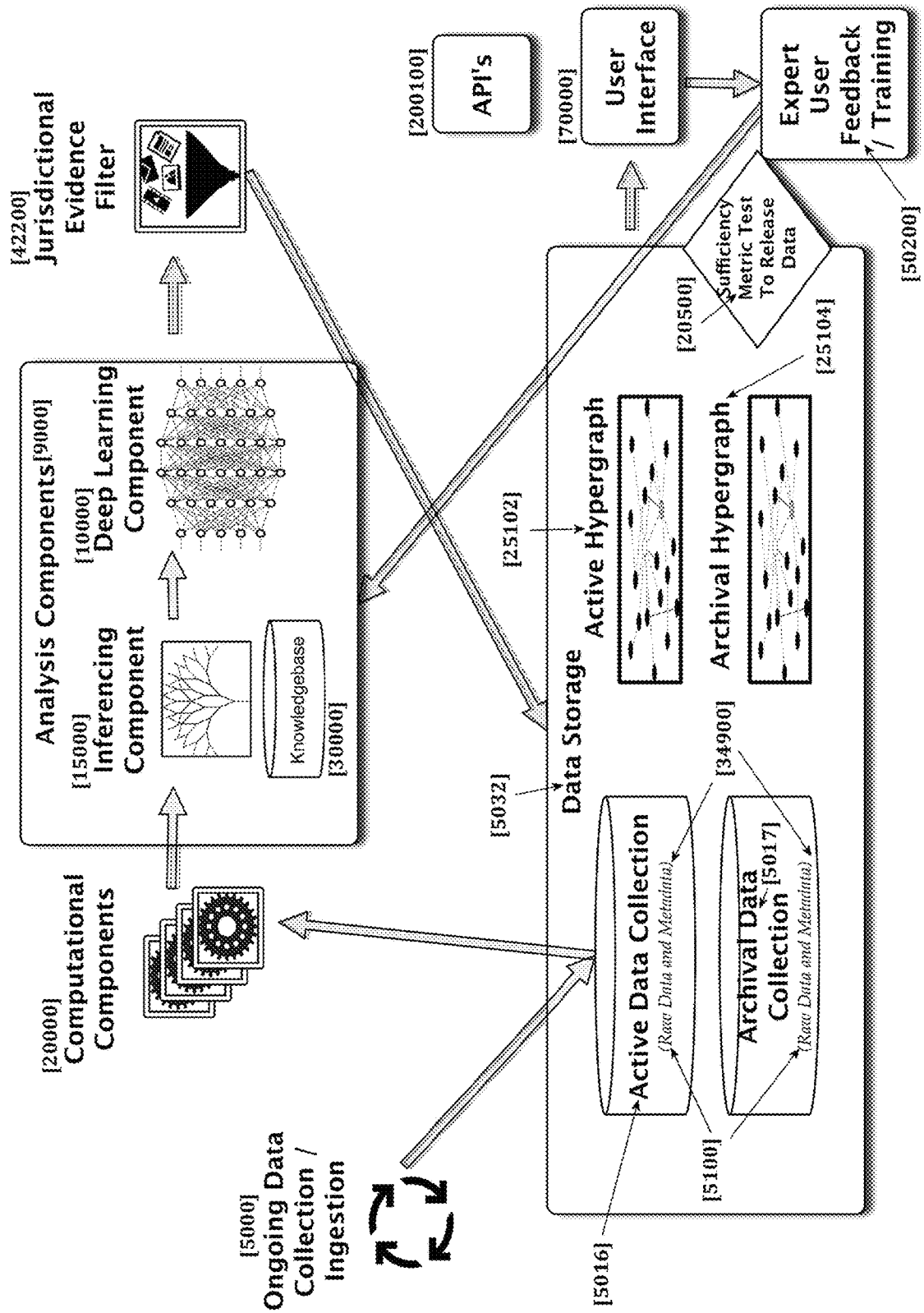
FIG. 1 is a diagram which illustrates the system processing pipeline.

At a high level, as illustrated in FIG. 1, the system's[100] processing pipeline[1000] is as follows:

Data[5100] is collected or ingested on an ongoing basis based on an initial set of instructions[5010]. The data [5100] will include posts[34105] on any type of electronic medium, whether the posts[34105] are text only, images[72000] only, audio only, or a mixture of any of these and/or other content types.

In most embodiments, the raw data items[5110] along with any derived metadata[20100] are persistently stored in the active data collection[5016] and will remain there until aged out by whatever aging-out policies[5014] are in place. Different embodiments may elect different strategies with respect to the data storage[5032] mechanism; some may find it convenient to share the data store[5032] with other systems. Separately, the hypergraph[25104] (or, if preferred, a multigraph[25110]) will be stored, and in most embodiments will also have separate aging-out policies[5014] that will act on different types of objects in the graph [25102]. Most embodiments will keep archives of older data[5100], both the data collection[5017] and the graph[25105] as specified in the system configuration [110].

Specific data items[5110] that have characteristics requiring derivation of indirect attributes[20100] will be sent to one or more computational components[20000] that will output the needed attributes[20100]. For example, color images[72000] will require a color palette[81000] identification attribute. Images[72000] require a descent tree[25220] in order to determine their provenance.

Depending on the particular embodiment, the data[5100] is next sent to the inferencing component[15000] so that further attributes—specifically, those requiring the data[5100] stored in the knowledge[30000] or rule base[30005]—can be determined. For example, if some kind of geodata[34180] or other location information [34180] for a poster[34106] is available, a jurisdiction [41000] will be assigned. In some embodiments, data [5100] may be sent concurrently to a deep learning component[10000].

Once a data record[5110] is assigned all relevant attributes that are currently possible to determine based on the currently available information—a value of "null" will be assigned in most embodiments where not possible—it will be passed to the deep learning component [10000]. The deep learning component[10000] will have already been trained with the best available relevant data; this is discussed further in the section on Exemplar Sets[32000]. (It should be noted that almost all embodiments will allow attribute values, including nulls, to be re-evaluated in the event that additional information becomes available. For example, a trigger can be used to propagate newly available location data[34180] about a particular actor[71000] from the knowledgebase[30000] to the individual data records [5110].)

With all of this calculable data[20100] in hand, the data items[5110] are passed to the deep learning component [10000] with the aim of identifying the target content even as it evolves due to the application of countermeasures[100000] and other environmental pressures. Additionally, many embodiments will also use machine learning[10000] as additional check against the attributes[20100] determined by the inferencing[15000] or computational components[20000]. For example, while color palette[81000] can be mathematically defined by a computational component[20000], a deep learning component[10000] can possibly do a better job of identifying images[72000] in which there was a clear, but not 100% successful, attempt to replicate to a particular color palette[81000]. Where such conflicting results are possible, most embodiments will allow users[50310] to specify in the configuration[110] how to handle (e.g. which component trumps, or whether the intervention of a human analyst[50310] will be required.)

Many embodiments will also use the deep learning component[10000] in an initial pass on the image data alone (e.g. the pixels[80128] in the image[72000]) and use this as an additional attribute.

Any updates to attribute values, including in some embodiments requests for human user[50310] adjudication in the event of conflicting results, will be made to the active data set[5016].

Appropriately trained users[50310] provide feedback [50200]/additional training data for the deep learning component[10000]. Similarly, the knowledgebase [30000] is continually updated. In most embodiments, data records[5110] will be passed to archival storage [5017] after a certain period for reasons of efficiency.

Image[72000] Composition & Attribute[72100] Definitions

In this document, an image[72000] is understood as having at least the following possible components:

Image body[72006] vs border[80110]: A border[80110] may be a distinct visual object with a color, stroke, texture, translucency, dimensions, etc., or failing that in the case of a given image[72000], will be approximated by the system [100]. Different embodiments may handle this differently, for example defaulting to a standard proportional border [80110] dimension, or by seeking a boundary around the edges of the images[72000] with the smallest amount of discontinuity in the pixels[80128]. The notion of a border [80110] is desirable in order to assess text as likely being a caption[183000] or a signature[77000], and so will be implemented by most embodiments.

Background image[180400]: If the body[72006] of the image[72000] consists of more than one DIC[73000] or visual element, the background[180400] of the image [72000] will be treated as a separate element. If there are no superimposed visual elements, the entire image[72000] will be considered the background image[180400]. Note that each DIC[73000] may also have a background image [180400].

Logical Image Components [20100]: Many images [72000] will composed of a variety of images[72000], overlaid text[80010], image filters. Each of these is considered an attribute.

Text Attribute Types[80000]: Text[80400] that is actually in an original image[72000] for example, a photograph of protesters holding signs with legible text[80400]-must be treated differently than text that is presumed to be a caption [183000] or text[80010] that has been superimposed or otherwise added to the body[72006] of an image[72000]. The two latter categories are in essence commentary about the image[72000] that is being added after the fact, often by someone other than the originator[75205] of the image [72000]. Likewise, text[72000] that appears in a post[34105] accompanying or containing the image[72000] is also treated as logically different by most embodiments, since it is not being atomically packaged with the image[72000]. Otherwise put, the image[72000] will likely become separated from the posts[34105] in further transmission—and because it should not generally be inferred that the actor [71000] who modified the image[72000] by adding text objects to it is the same as the actor[71000] who is posting it.

Symbolic Objects[82000]: In most real world use cases, certain objects will be of special interest, either as abstract symbols, or in a more literal sense (e.g. a dead body to send a threat.) In many embodiments, only such object types of known interest will actively be sought for categorization, for reasons of efficiency.

Color Palette[81000] and other visual signature elements [73300]: This category includes any type of visual branding element[73300]. Otherwise put, these are designed—in similarities intended to cue an audience that the images [72000] are all related to the same brand or source[75210].

Standard image metadata[34900], such as resolution, date and time, geodata[34180], etc.

Additionally, images[72000] have the following general properties that relate to the context of the distribution of the image[72000] rather than its contents:

Actor[71000]: This includes anyone who creates, edits, posts, redistributes, comments on, or otherwise takes some action concerning the image[72000]. In almost all embodiments, the attributes of these actors[71000] also become considered attributes of the image[72000]—for example, their presumed location[34180], any group affiliations [71100] they have, etc.

Event: Any visual depiction[270100], symbolic, textual or other reference to an identifiable event[31700]. This may be a recent newsworthy event, a historical event, a religious, mythical, or fictional one[31700].

Posts[34105]: Any text assessed as relating to the image [72000]- or other types of posted data[5110] including other images[72000].

Related Images[72000]: Many images[72000] will have "relatives"[180035] that differ from them by a known transformation[73014] or LIC[20100], the addition or subtraction of a DIC[73000], or similar. These are considered members of the same image family[180040], except in the case of embodiments that truncate families[180040] in the event that images[72000] with the same provenance are being consumed by totally different populations.

Transmission Characteristics: Since the vast majority of posts[34105] (or images[72000] posted) are not meaningfully redistributed, those that are immediately become interesting. The main possible causes include the popularity of the posting actor[71000] within some extended group [71100], the importance at that point in time of an event [31700] being referenced or depicted, and the inherent novelty and/or appealingness of the content. These different reasons will generally result in different transmission patterns[34002]—for example, a fan-motivated distribution is likely to be restricted mostly to the fan club and perhaps a hop out, whereas one that is motivated by intense interest in an event[31700] is likely to have many overlapping demographic groups. Thus most embodiments will wish to characterize these transmission patterns[34002], as they can provide significant clues about the context of an image [72000].

Forums: Where the image has appeared, the lowest level forum.

Figure 2:
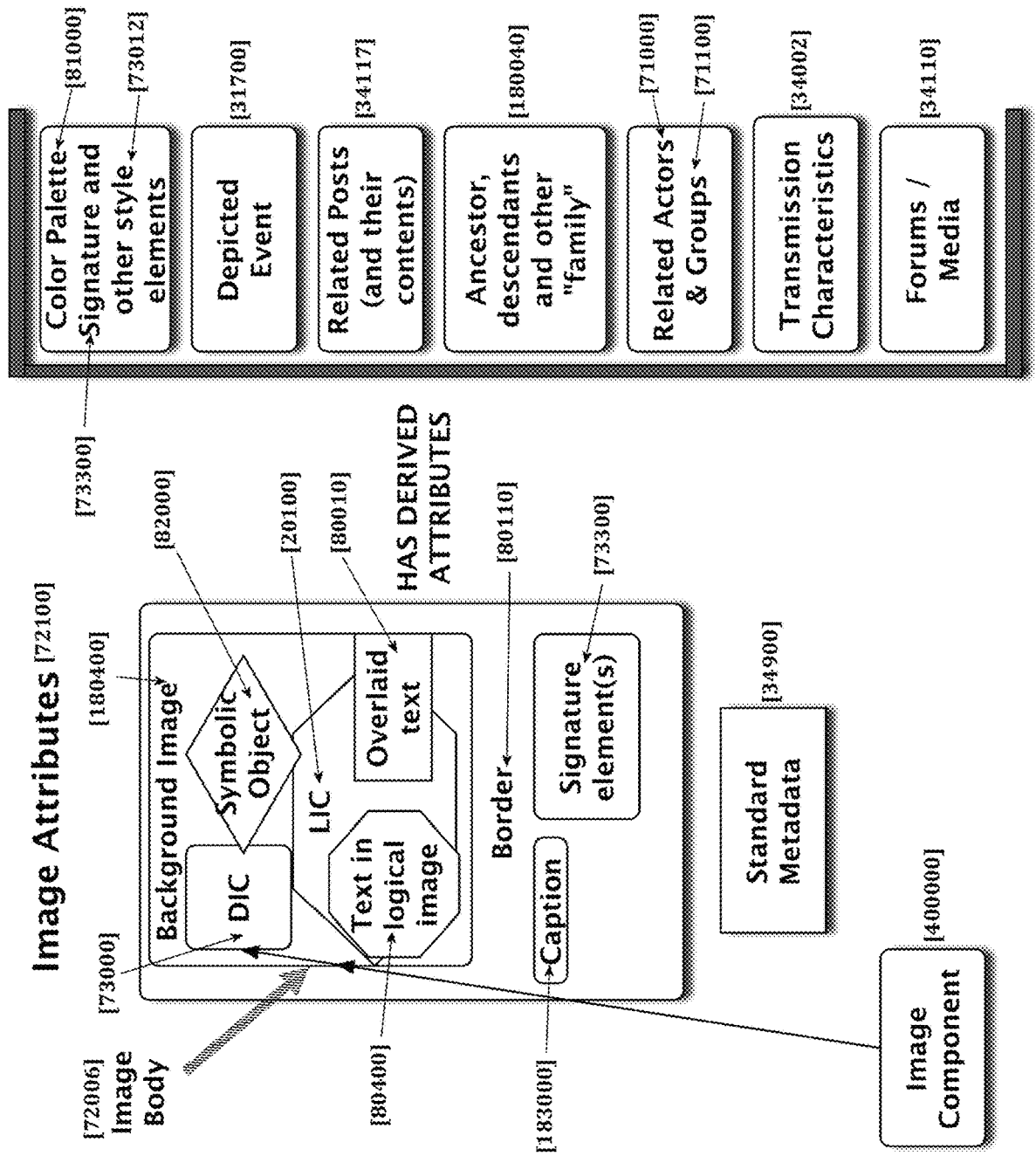
FIG. 2 is a block diagram which illustrates the composition & attribute definitions of an image.

These are illustrated in FIG. 2.

Collection[5000] & Initiation

In many embodiments, data collection[5000] is begun on the basis of abstract collection instructions[5010] and/or a specific set of exemplars[5020], which may be any combination of objects such as identities[71000]/accounts[34102]/ actors[71000], URL's, particular forums[34110], images [72000], or text as well as operations[73010] that can be applied to them so as to generalize or expand the set[5020]. Existing data[5100] may also be directly ingested programmatically[200100]. In most embodiments, the collection process[5000] must be allowed to run for sufficiently long that certain internal metrics[20500] are achieved, for example, that the outputted image forest[25200] possesses a certain pre-set number of links[25210]. However any of a number of complexity metrics[20500] can be used by different embodiments so as to ensure that the system has already taken in enough data[5100] so as to output meaningful results[21050].

The breadth of the collection[5000] will vary depending upon the types of actors[71000] in question and the objectives. In some cases, it will be sufficient to input a list of forums[34110] of known interest (for example, known jihadist forums), and specify a metric[20500] such as the number of hops to go out from that forum[34110] for the base collection of images[72000]; the collected images [72000] are then searched for with a dedicated image search engine which then recursively expands the search. In others, topical analysis of the forum[34110] or surrounding context from a very broad web crawl may be used to select which images[72000] should be harvested—or be ignored—for the initial set[5100]. In some of these cases, features[72100] of a sample of the images[72000] themselves will be factored in. In other cases, an extremely broad collection[5000] might be appropriate. In some instances, an overall sampling approach may be chosen, simply because of the scale of the data[5100]. For subsequent and ongoing collections[5000], known image signatures[73300] of interest may be used as hints to the collection engine[5001] as to where to collect.

Depending on the breadth of the collection[5000], perhaps only a small portion of the collected data[5100] will have any relevance. In most embodiments, data[5100] that is clearly irrelevant will be discarded after a specified user-defined period. However many embodiments will allow policies[5014] to be set to keep certain types of data[5100] around for training purposes. Many embodiments will preserve the information that a given URL (or actor[71000], etc.) yielded nothing of relevance, so that at the least, such sources[5005] can be deprioritized for subsequent collections[5000], or removed altogether for some preconfigured period of time. Few embodiments will remove sources [5005] altogether permanently, solely on the basis of failure to find anything relevant, as opposed to by user input [50310]. This is to avoid the scenario in which the behavior or orientation[5007] of a source[5005] changes from uninteresting to interesting.

An instance of the analysis portion[9000] of the system [100] is initiated with a set of both direct[7300] and indirect features[20100] that it will compute, store, and use for analysis for a particular purpose. These features are likely to be at least somewhat embodiment and specific use case-dependent. Further, almost all embodiments allow for the introduction of both direct[7300] and derived features [20100] over time based on improved tradecraft, or specific intelligence[50200] as understanding changes. This is because it is simply not realistic to assume that all useful signals will be "learned" automatically or initially by a deep learning component[10000], especially given the size of data[5100] typically in question. And even if it were, at the point that there is solid information that can help identify important content, it should be incorporated immediately.

In most embodiments, if additional features are added later on, it will be possible to re-evaluate the existing active data items[5016] for these new features. In the event, that existing features[72119] are removed, in most embodiments, the evidence links[39600] corresponding to these features are simply stripped out in on-the-fly calculations, much as if they were being disallowed in a given jurisdiction[41000].

While data is being collected or otherwise ingested, the deep learning component[10000] will be trained on a carefully annotated "exemplar" data set[32000] that is appropriate to the specified mission; in most cases, it will also have already been trained on broader data sets that can be used to do more generic things like categorize images[72000] by color palette[81000], stylization level[73012], OCR' ability [21001] of any text, and any number of other such things. If deemed appropriate to the circumstance, the deep learning component[10000] will also be trained on somewhat relevant data sets (e.g. data from a different terrorist group from the same geographic region and similar goals.)

A Word about Exemplar Sets[32000]

For the purpose of creating a set of exemplars[32000] optimized for a given group[71100] within a given timeframe, it is critically important to be careful in selecting criteria for establishing that a given image[72000] did indeed originate with a particular entity—as opposed to (for example) copycats, pranksters, agents of disinformation or deliberate confusion, or a different group[71100] operating in a similar geographic region[34180] and/or ideological territory. Otherwise the integrity of the exemplar set[32000] can be severely compromised, and along with it results throughout the ML processing pipeline[1000].

For this reason, many embodiments will prefer to set a quite high bar for assessing that an image[72000] is associated with a particular group[71100] for inclusion in an exemplar set[32000], even at the cost of neglecting data that is likely good. Specifically, many embodiments will require an image[72000] to have multiple points of contact with individuals (or at least user accounts[34102]) known (or at least believed) to be in—or associated with—the group [71100] in question. For example, the image[72000] would have to have been posted, sent, modified, or commented upon, etc. by at least N known members of the group[71100] in question. Other embodiments may additionally require the presence of multiple features highly correlated to the group[71100], as well as the absence of any known negating features.

In most embodiments, exemplar sets[32000] will be stored in the knowledgebase[30000]. In most embodiments, the container object will have the following attributes: name, UID[30010], associated target group[71100], time window [100500] (expressible either as a date range, or the UID [30010] of a measure-countermeasure window[100500],) and one or more zone[100800] UID's[30010].

Computational Components[20000]

Which computational components[20000] will be required depends entirely on the derived attributes[20100] for which the system[100] has been configured. Some embodiments may indeed opt to have more than one computational component[20000] or approach for the same attribute[20100], implementing a voting or exception flagging mechanism in the event of disagreement among the different methods. In general, such computations can proceed in parallel, except of course in such cases as one component[200000 is dependent on the output[21050] of one or more other components[20000].

Examples of computational components[20000] include, but are certainly not limited to, the following:
 Color palette[81000] determination
 Identification of languages and dialects reflected in any text embedded[80010] in the image[72000], and separately, that is associated with it in posts[34105] or in captions[183000]
 Similarly, OCR'ing of any such text[80010]

Lexical fingerprinting
Application of deception theory
Image background reconstruction[180410]
Application of transformations[73014]
Image ancestry determinations
Analysis Components[9000]

An explicit inferencing or rules-based component[15000] is included in almost all embodiments so that different kinds of important expert knowledge[50200] can be quickly incorporated into the analysis even if they would not be picked up via deep learning[10000], for example because the thing in question is extremely low frequency—as for example, suicide bombings are in most countries. In some embodiments, information from the computational component(s)[20000] is passed to both the inferencing component[15000] and the deep learning[10000] one simultaneously so that the difference in deep learning output[10050] with and without the external output[15050] can be assessed.

An internal knowledgebase[30000] backs the inferencing component[15000] in most embodiments. It typically includes, but is not limited to, such information as what is known about promulgators or groups of interest, known or probable members of the group[71100], countermeasures [100000] applied within a particular region[41000], relevant topics[34120] and significant events of interest[31700, 31710], specific types of objects with symbolic significance [82000], as well as empirically—and automatically—measured things such as the length of time it takes for news of a new countermeasure being spread[100500] among a particular group[71100] in a particular place[41000].

To take a very simple example of the usage, rules[15015] in the inferencing component[15000] in a given instantiation of the system[100] may be set up so that if a minimum of ten actors[71000] who are known members of a terrorist organization interact with an image[72000] (as per information in the knowledgebase[30000]), it will be considered to be a "bad" image.

Most embodiments will support parallel sets of hypothesis[30060] or purported "facts"[30070] in the knowledgebase[30000] so as to see whether or not reliance on different "facts"[30070] will change the end analytical output [21050]- and whether the use of a given set[5105] seems to result in improved analytical output[21050]. For example, different entities may define terrorist group orientations [5007] differently (e.g. violent vs. non-violent.) They may also disagree on who the members of a group[71100] are, where a given actor[71000] physically is, whether alive or dead, which accounts[34102] map to which humans[71000], and many other things. Such disagreements are inevitable in certain domains, and any successful technology approach must factor them in.

In most embodiments, if alternate fact sets[30075] are in use, each fact[30070] must be assigned a fact set[30075] to avoid ambiguity; if none is set, the value of the fact set attribute[30076] will be null. In most embodiments, these fact sets[30075] can be hierarchical, so as to for example capture different categories of assertions of fact[30070] by different departments of the same entity. A configuration file[110] will indicate which fact sets[30075] to use together (along with the default facts[30070] where there are no alternative ones) so as to avoid unnecessary combinatorics in the event that there are many such fact sets[30075].

The user interface[70000] of most embodiments will support a visual "diff" function so that any changes in the analytical results[21050] that are associated with either the difference between a particular fact set[30075] and the default one[30075], or among one or more fact sets[30075] can be easily seen. Most embodiments will allow users [50310] with appropriate credentials to provide feedback [50200] on which of the fact set-change-related analytic conclusions[21050] are superior.

In most embodiments, a deep learning component[10000] is the last step in the processing pipeline[1000], with the exception of expert user feedback[50200] that is needed for training purposes and any filtering[42200] of evidence that may be needed in certain countries[41000]. (Such filtering will in general be done on the fly, but some embodiments may find it more convenient in certain cases to maintain alternate active data stores[5032].) It should be noted that unlike in many deep learning applications, training/re-training may be fairly frequently needed owing to changing external conditions (e.g. new measures[90000] and countermeasures[100000].)

In most embodiments, the goal of the deep learning component[10000] is not to merely identify instances of the desired (often "bad") content at any point in time, but also to identify instances of any new types of transformations [73014] being applied so as to morph a visual feature that is now on the radar to something that is on the one hand different enough so as to likely no longer be trapped by a standard ML feature detector but on the other hand is still likely to be recognizable to a good portion of the target audience. Otherwise put, what is being targeted for learning is the transformation[73014].

To take one gruesome concrete example, while as previously noted, ML-based feature detectors became commonly deployed to detect photographs or videos of beheadings, one variation on beheading photographs seen in France was one that showed several men prostrate on the ground, as if in Muslim prayer position—except that instead of their foreheads touching the ground, the heads had been severed and had been replaced atop their bodies, but pointing the opposite direction (e.g. facing the sky.) A human viewing the image quickly realizes that beheadings had already occurred. However the fact that visually the severed heads were still visually connected to the bodies would be challenging for standard ML feature detectors that were trained on either the action of beheading or its immediately result, a clearly severed head. This is a clear case of the image having successfully conveyed the intended result to its audience without offering up an obvious feature to attach. Ideally, the deep learning component[10000], fortified with a hint about a countermeasure[100000] targeting beheading images[72000] would generalize the concept of a beheading picture to include any image[72000] with a human head in a highly unusual position. But failing that, if the image [72000] is nonetheless recognized by the system[100] as having probable terrorist associations, a human analyst [50310] could quickly specify that the deep learning component[10000] be retrained with images[72000] of heads in unusual places or positions relative to a body.

Some embodiments will come equipped with applications that would facilitate this process, for example, allowing a user to outline the head and choose what aspect of its visual presentation[73010] is now being altered.

In some embodiments, the deep learning component [10000] will be trained to recognize specific LIC's[20100] or features that either have been found in images[72000] of interest, or are reasonably anticipatable subsequent to the deployment of a particular countermeasure[100000]. In the latter case, training images[10000] can be generated from existing images[72000] that are transformed, overlaid, or otherwise altered so as to contain the desired visual element.

For example, a deep learning component[10000] can be trained to recognize features[72100] including but not limited to:

Embedded text[80010] in a mixture of multiple languages
Difficult to OCR/visually obscured embedded text[80010]
The presence of a signature element[73300]
Quotations[75200] (e.g. Koranic, Hadiths, various manifestos, etc.)
Color palette[81000]
Presence of specific objects of interests
Various combinations (e.g. multilingual and quotation [75200])

Human users[50310] trained the deep learning component [10000] with an application that allowed them to outline and label features of interest within the image[72000], and also to indicate whether the image[72000] was considered to be terrorist in nature. The deep learning component[10000] would then provide as output[10050] fresh images[72000] with the elements in question appropriately highlighted. It would also output a probability that the image was terrorist in intent[82510], at least in the given context.

Figure 3:
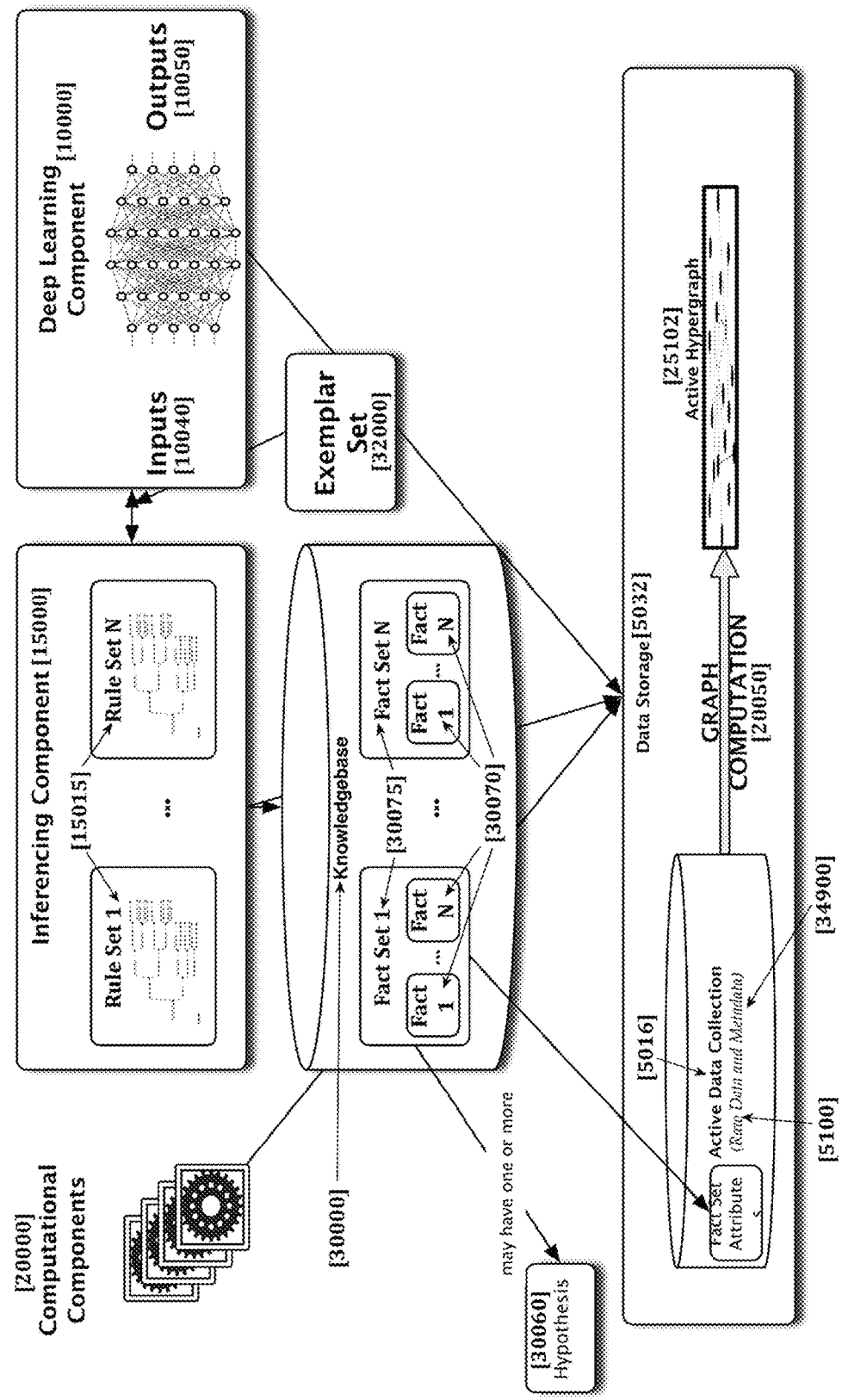
FIG. 3 is a diagram which illustrates the different analysis components of the system.

These are illustrated in FIG. 3.

High Level Model

Figure 4:
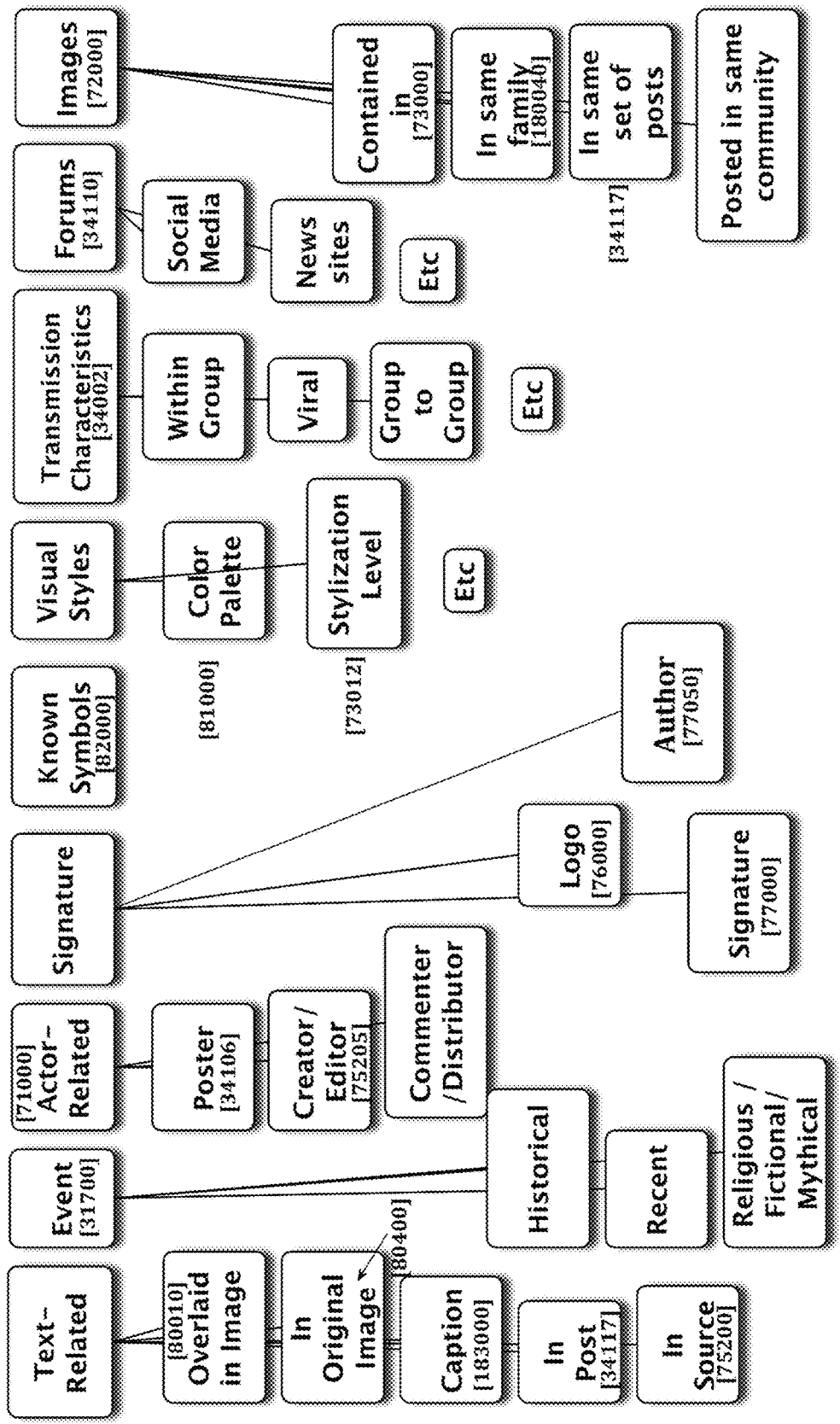
FIG. 4 is a block diagram which illustrates the different types of evidence source.

Just about all embodiments of the system[100] will avail themselves of a multi-evidence model, which is to say employ as many different types of evidence as possible, as illustrated in FIG. 4, even those that may not show up frequently for whatever reasons. For this reason, the preferred embodiment uses a hypergraph[25102]; other embodiments may use a multigraph or other type of graph structure that minimally allows the expression of multiple types of links[21201] that connect nodes[21202], as well as different types of nodes[21202]. Different embodiments may then select their own preferred specific computations for things like determining communities and other structures of interest as well as distance/nearness measures.

Many embodiments will include at least the following evidence types, many of which have sub-attributes:

Appearance and semantic characteristics of any text [80400] embedded in the image[72000]
Likewise for any text[80010] overlaid on the image [72000]
Characteristics of the textual comments concerning the image[72000]
Presence of representations of specific real world objects [82000] (e.g. any machine gun, any sword, etc.)
Depiction of (or reference to) known historic, news, mythical, religious event[31700]
Color palette[81000] similarity
Characteristics of the actors[71000] who post, comment, or otherwise perform some discrete action related to the image[72000]
Presence of a logo[76000], signature[77000], or some other kind of identifying mark
Characteristics of any related images[72000] (e.g. image components[400000] or images[72000] that appear in related posts[34117])
Characteristics of the forums or media[34110] where the image[72000] is posted
Presentation style[73012]/specific transformations [73010] such as filters, bordering styles[80110], etc.
Transmission characteristics[34002]
How often the image[72000] is removed after having been posted (including removal of the containing post [34105])

The section below documents the evidence types and subtypes[39000] used in one embodiment of the system. Other embodiments are certainly not limited to these particular ones.

Text-Related

Is there text overlaid in the body of the image[72000] (not the border[80110])? That appears as a logical part[80400] of the image body[20100]? That is (likely) a caption[183000], on or near the border[80110]?

If so:
Font details: What are the font families[74252], exact fonts[74200], colors[74254], etc.?
Is the text OCR'able such that OCR'ing it with high quality OCR software produces output that is consistent with the generally accepted recognition standards for the language in question?
If the text can be successfully OCR'ed:
What language(s) is it in? Note that mixed language embedded text[80010] is fairly common in jihadist images[72000], for example.
Is the text recognizable as a citation[75200] of a known source[75205], for example a known terrorist propagandist, specific Koran surats, Hadith citations, etc.? Is it similar to a narrative being promulgated by a state actor[71000] as determined by textblocking [130000] as discussed in U.S. Pat. No. 9,569,729B1 or other accepted methods of determining the similarity of two sets of contiguous tokens?
What references to named entities[75100] are there, including certain specific slots such as a person [75205] to whom a quote[75200] is being attributed?
Is there something that is apparently a signature [77000]? If so, is that signature[77000] associated with a known actor[71000] in the knowledgebase [30000]; if so, an author[77050] will be assigned to the DIC[73000] or containing image[72000] depending on the location of the signature[77000]. Different embodiments may consider text to apparently be a signature[77000] with methods that include but are not limited to the following: presence in or along the image border[80110] (exclusive of date/time), proximity to an overlaid image[80020] of similar height to the font[74256] (e.g. a likely logo[76000]), presence of the same tokens in a similar location on other images7[2000] posted by either the same actor or actors[71000] within the same graph neighborhood in any accepted SNA analysis method. Additionally, many embodiments will set a token limit on what can be considered a signature[77000]; many will also preclude any string that includes punctuation.

Figure 5:
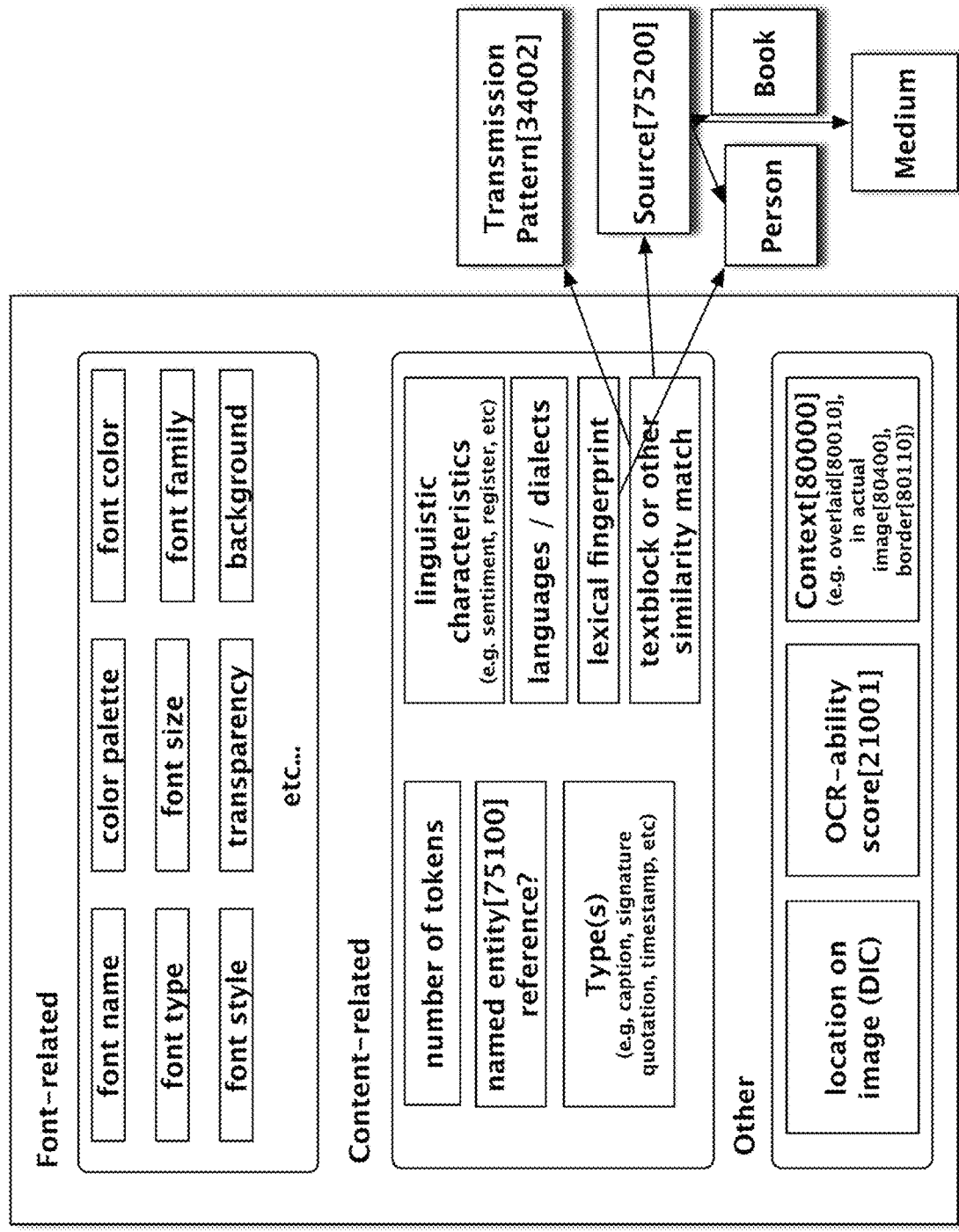
FIG. 5 is a block diagram which illustrates the core text-in-image attributes.

These attributes are illustrated in FIG. 5.

Logo-Related

Are there one or more logos[76000] or similar element that is superimposed on the image[72000]?

If so:
What is the placement? For example, along a border [80110]? If so, which border[80110]? If not, in which quadrant of the image[72000], or in the center? How exactly is it superimposed, for example, what is the transparency of the logo[76000]? Of its background [180400]? Does its border have a stroke? Are there extraneous pixels owing to a sloppy insertion?
Is it similar to prior logos[76000] found embedded in images[72000] from known publishers? ("Similarity" may be assessed by any accepted image similarity determination method.)

Is it superimposed on a solid background, such as a border, or against a variegated background?

If the logo[76000] is recognizable as a representation of a real world object, what is this object? And does it correspond to similar object choice in the images [72000] of known publishers?

If the logo[76000] itself contains textual elements that are extractable, what are these elements? Likewise, does the logo[76000] appear juxtaposed to text that is suggestive of a signature[77000] (e.g. appropriate number of tokens, capitalization, honorifics, etc.)?

Color palette[81000]: As in any other type of branding, the selection of an uncommon color palette[81000] is an effective means of associating an image[72000] with an entity. Most embodiments will make allowances for some botching in the exact implementation of the color palette [81000]. For example, some embodiments will use color approximation schemes to expand the space of what will be considered sufficiently similar.

Featured elements: As already discussed, images[72000] may feature particular "signature" objects[73300] (e.g. a sword or machine gun) that may be captured with well-known machine learning methods. This approach will only work when the particular feature[73300] in question shows up a significant amount, but still should not be omitted on general principle.

Backgrounds[73120] (cityscapes and other non-single-feature visual elements): Complex backgrounds[73120] are often used to invoke a place and/or time, for example a holy city as it existed during the time of the Prophet. A complex background[73120] may also depict a particular historical, mythical, fictional, or recent event[31700], for example an important battle or a Biblical/Koranic story. Text or other visual elements[72100] are often superimposed over a good fraction of the background[73120], which may be quite subtle and/or partially obscured by the overlaid text[80010] or graphics[80020]. Nonetheless, if the image background [73120] is identifiable as an image component[400000] of possible interest, it is reconstructed without the overlays (if needed) to the extent possible and stored. This is both so that it can be identified again if it is seen elsewhere, and with the hope of identifying the reference[82510] if geographical and/or historical in nature.

This last is important because both state actors and terrorist groups are prone to incorporate references[82510] to specific historical incidents or periods[31700] that suit their purposes. These incidents[31700] are sometimes several centuries old, and may also be quite obscure (which facilitates repurposing them for propaganda purposes.) Thus endeavoring to correctly identify such visual references [82510] is well worth it since in some cases simply the reference[82510] itself is a highly suggestive marker.

Such background elements[73120] in many embodiments will only have a small number of attributes:

A distillation of the reconstituted background element [73120] such that contrast[81100] in contours is preserved (e.g. at least the outline of a building, cityscape or other object of interest is preserved.)

An extracted title or caption[183000], either from embedded text[80010], metadata[34900] directly associated with the image[72000], text from an accompanying post[34105] or, in some embodiments, text from any kind of reply action[34167] (e.g. retweets and similar.)

The system-assigned UID[30010] for a specific place [31703] or historical event[31700]; will be null in most embodiments if none is identifiable from the knowledgebase[30000]; some embodiments may opt to launch external searches for any null case in which other markers of interest are present, and/or flag them for human analyst review.

If non-null, the computed probability of a correct match; some embodiments may opt to allow more than one place[31703] or event[31700] and associated probability in cases in which there is no clear match. Most embodiments will use a hierarchy of events[31700] as a means of handling potential ambiguities between two similar events[31700]. For example, the Prophet addressing the public in Mecca vs some other location [31703] may be two distinct historical events[31700] that have somewhat different connotations[50120]. But if there is no way to disambiguate which was depicted, there is still value in capturing that the image[72000] is a depiction of the Prophet giving a sermon.

If an identified place absent a particular event[31700], then an estimated timespan[73140]. This is important, since the same location[31703] may have very different connotations[50120] depending on the timeframe [73140]—for example Nuremberg in 1934 during an annual Nazi party rally and in 1945 after it was largely turned into rubble by Allied bombardment. Most embodiments will find it useful to create windows of time[73140] such that the older the image reference [82000], the longer the window[73140]. This is because in the case of really old image sources[72000], even ascertaining the century with certainty might not be possible—and may also not be so important.

Note that most embodiments will have a knowledgebase [30000] that links historical and mythical events[31700] to known interpretations and connotations[50120] (e.g. resistance to a corrupt, autocratic government); new interpretations[50120] may arise over time, given that propagandists can be extremely brazen in repurposing historical events [31700], especially more distant ones[31700].

Metadata [34900]

For each distinct image[72000]:

The unique system-generated ID[30010] for that exact image[72000]; in some embodiments there may be an UID[30010] that can be used for a set of images[72000] whose only variation from one another is the result of differences in image resolution and other common transformations[73010] that are the result of normal real world transmission of an image[72000]. In many embodiments, such a shared UID[30010] would be a component of the various unique ID's[30010]. However, some embodiments may prefer to just use a single UID[30010] for all images[72000] that differ only by image resolution or similar[73010], if their use case does not require things like the ability to track the order of transmission of an image[72000].

Each delta from the currently known set of closest variations[73015]. Examples include, but are not limited to: the application of different filters, cropping, compositing of additional/fewer external visual elements, different resolution, modification of borders[73010]

Whether the exact image[72000] has been deemed a "bad" image or image[72000] of interest. This is largely for use in auto-assembling training sets[10000] for the deep learning component[10000]. In most embodiments this will be expressed as a probability. In most embodiments, if the exact same image[72000] or DIC[73000] is used in entirely different social contexts, the U1D[30010] will have a suffix added to it allowing the image families[180040] to separate from that point onward.

For each post[34105] that accompanies an image[72000] (or, in many embodiments, occurs within the same "burst" [71250] or time window[100500] as the image-bearing post[34105] on the part of the same author[34106]):

User handle, and extractable information from the user profile; most embodiments will opt to grab all available profile information.

Title of post, if appropriate for the given forum[34110], otherwise null Posting date & time stamp, and time zone Location of poster[34180], if knowable, otherwise null The forum/media type, and if appropriate news group or similar sub-forum[3110]

Contents of any textual message[80010] contained in the image post[34105]; in some embodiments, extraction of named entities[75100] and probable references to specific events[31700, 31710] will be performed downstream as needed, and will in this event be stored.

The thread (or other comparable unit of information [5110]) in which the image[72000] was posted, if appropriate to the forum[34110] in question; null if not applicable. Note that this should include not just what occurred in the thread prior to the post[34105] but also what the responses and subsequent posts were, since the responses may articulate presumptions about the provenance and pragmatic intent[82510] of the post [34105].

Co-posted images[72000]: Other images[72000] that appear either in the same post, or in a "burst"[71250] of posts[34105] by the same author[34106]. A "burst"[71250] can be defined as in U.S. Pat. No. 9,569,729 according to a user-configured time window[100500], or alternately according to any accepted statistical method. It should be noted that not all platforms may allow more than one image[72000] per post[34105], so especially in these cases, it is necessary to consider a broader window[100500]. Some embodiments will opt to discard text within the same burst[71250] but which is posted after a different image [72000].

Derived features for each user[34102] who posts or otherwise redistributes an image[72000]; some embodiments will prefer to do this at the image component[400000] level:

List of Other Known User Handles

Graph (with directionality) of other users[34106] whose content this person copies or reposts, and of users [34106] who copy or repost this person's content Temporal Elements/Characteristics of Spread[34002]

Most embodiments of the invention will concern themselves principally with image components[400000] or images[72000] that have been substantially propagated—and those that appear to be on the path to doing so—based upon previously observed patterns of propagation[34002]. This is in part because there is usually a correlation between that and real world impact, but also because there is considerable information in how, where, and how quickly the image[72000] has been propagated that helps to attach it to a publisher of interest. However there are certain important classes of exception to this. For example an image that ever shows up even a small number of times in a jihadist forum oriented towards suicide bombers is perhaps already of interest on that basis.

Knowledge Model[26000]

We use the term "knowledgebase"[30000] in a traditional sense, which is to say that it is a data store[5032] used by an inferencing component[15000] that contains knowledge about the outside world. Although it will certainly be the case that information stored in the knowledge model [26000] will overlap with data[5105] that is stored in the graph[25102] or which is outputted by the deep learning component[10000], the data[5105] in the knowledgebase [30000] is different in that it is all either actual presumed-to-have-been-verified fact[30070] (e.g. the policies for permissible evidence in a given jurisdiction[41000] are currently X, important event[31700] Q occurred on date [73140] Y, etc.) or else an intelligence assessment. Otherwise put, it is not computational in nature. Some embodiments will allot a field for specifying which of the two is the case, as it cannot always just be assumed on the basis of the knowledge object type. For example, there can be uncertainty about the dates[73140] of certain kinds of events [31700].

In most embodiments, the knowledge model[26000] contains information about at least the following types of objects:

Measure[90000] and countermeasure[100000] pairs in different jurisdictions[41000]—in essence a triplet—so that any event such as a post[34105] can, in most cases, be easily placed within the correct measure/countermeasure[100000] window in a given region. Attributes include but are not limited to:

UID[30010]

Jurisdiction(s)[41000]

Measure [90000]

Name

UID[30010]

Date and time

Description

Codes for specific objects, style treatments[73012] etc. so that associated link evidence types, deep learning component inputs[10040], or rules [15015] can be updated automatically to the extent possible)

Exemplar(s)[5020]

Countermeasure [100000]

Name

UID[30010]

Date and time

Description

Codes for specific objects, style treatments[73012] etc. so that associated link evidence types, deep learning component inputs[10040], or rules [15015] can be updated automatically to the extent possible)

Different kinds of zone[100800] information, including legal jurisdictions[41000], linguistic, religious, and cultural regions. This includes policies about what types of evidence are allowable in each jurisdiction [41000]. Other attributes include:

Zone[100800] type (e.g. jurisdiction)

Name

UID [30010]

Language(s)

Geographic data including but not limited to: IP ranges, named entities such as cities, towns, and points of interest, latitude and longitude, etc.

Figure 6:
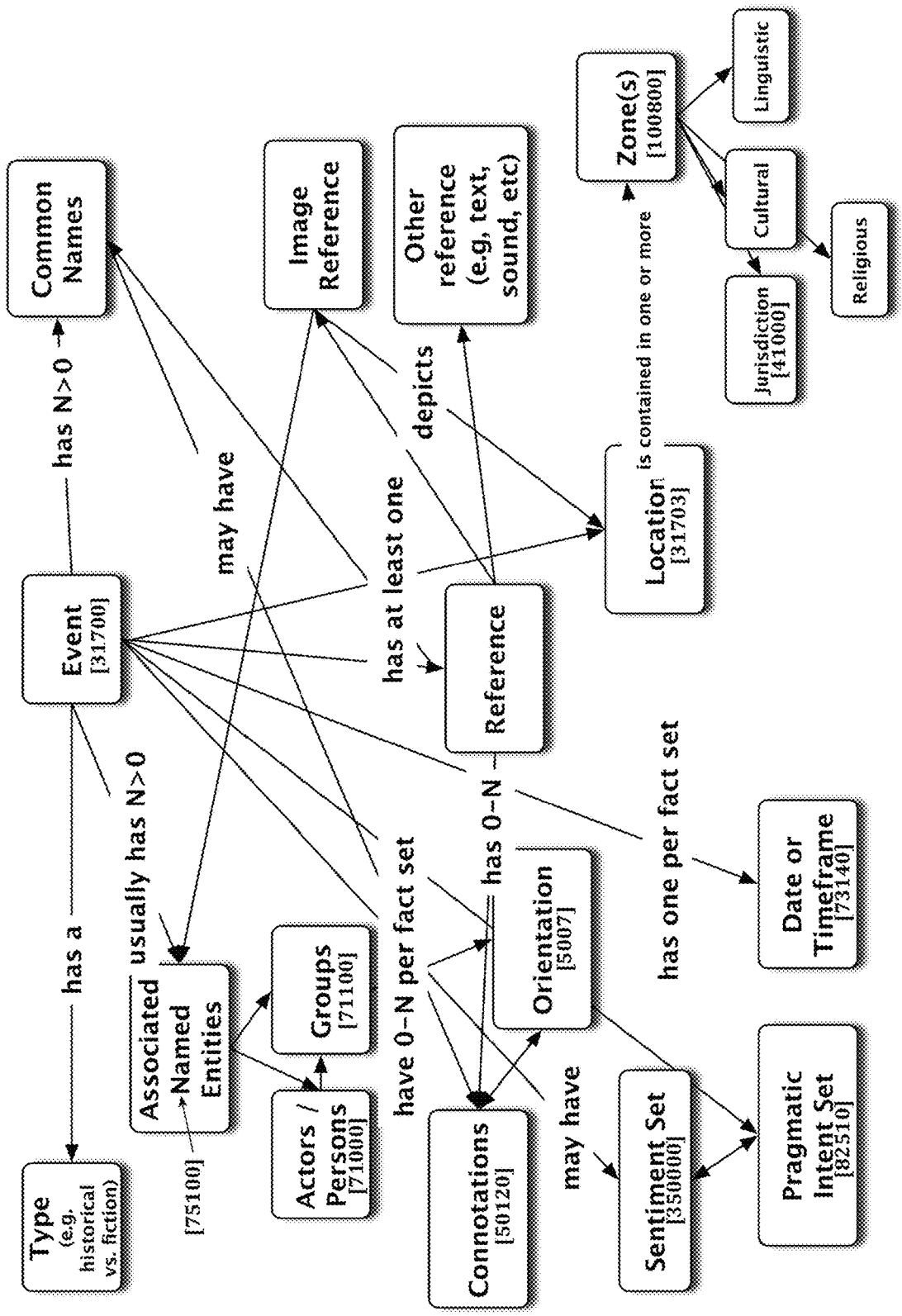
FIG. 6 is a block diagram which illustrates the core event attributes.

Significant events[31700]: events[31700] of interest that are likely to be depicted in pictures and/or referenced in text. These may be historical or recent, cultural, regional or religious in nature. The only criterion is that they are considered worth the effort to capture. As shown in FIG. 6, Event Attributes include:

Event name
Event UID[30010]
Relevant zones[100800] and zone[100800] types
Relevant languages and dialects
Date or date range of event[73140]
Direct reference words or phrases in each relevant language and dialect
Indirect references including named entities[75100] (for example the names of key persons[71000] or locations[31703] involved in the event[31700].) Most embodiments will include any data type that can convey such a reference, be it image[72000], sound, text, or anything else. Note that some embodiments may opt to supplement with their own images[72000] by performing a broad image search. However, in the case of locations[31703], most of these embodiments will perform a time-limited search based on the date range[73140] attribute. This is because things like skylines of a city can change profoundly over time.
Specific types of objects that may be understood as references to the event, both names and photograph and/or drawing exemplars[5020]
Event types[31702]—note the plural; an event may be assigned more than one type[31702] in most embodiments. Types[31702] include but are not limited to: protest, liberation, victory, defeat, bombing, invasion, battle, natural disaster, religious (e.g. Biblical/Koranic, mythical etc.), murder, election, trial, treaty, current event, historic event.
Either/both common sentiments and pragmatic intents associated with the event to use in any topic/sentiment categorization. Note that these may often be a wide range.
Common connotations[50120] if any (e.g. Battle of Waterloo as a military disaster)
Actors [71000] of interest
Known logos[76000], signatures[77000] and any other particular visual elements used
Visual style[73012] information, such as preferred color palette[81000]
Group[71100] affiliations of interest
Believed physical location and citizenship(s) if known
Groups[71100] of interest
Known logos[76000] and other "signature" elements [73300] used
Visual style[73012] information, such as preferred color palette[81000]
Orientation[5007]
Known members
Forums of interest[34110]
Orientation[5007]
Relevant Topics[34120]: some embodiments may opt to store topic information apart from "significant events." There may not be such concrete "significant events" in all cases. Storing topics[34120] allows for the capture of abstract topics[34120]. (Each embodiment will determine the information needed in order to identify a topic to a degree sufficient for its needs.)
Symbolic Objects: some embodiments may store information about specific types of objects or likenesses that are used to convey specific meanings of interest. Most of these embodiments will store variants of these, for example the depiction of a lion footprint instead of a lion's instantly recognizable face and mane.
Orientation[5007]: this construct has values defined for it in each individual real-world scenario that is to be handled by a given instance of the system. Its purpose is to provide the appropriate context for interpreting the posts [34105] of actors[71000], groups[71100], and forums[34110]. It helps prevent posts[34105] of images [72000] with unrelated—and often opposite pragmatic intents[82510] (for example law enforcement and criminal organizations)—from being wrongly commingled. It's attributes include:
Name
UID[30010]
Values (e.g. "terrorist", "armed forces", etc.)
For each value, pairs of relevant topics or named entities and sentiments or pragmatic intents[82510] (e.g. "suicide attack" "happy" in the case of "terrorist.")
Transmission Characteristics: While the rare image or video[72000] of nothing of particular importance may "go viral" for unknown or quirky reasons, excluding significant breaking news stories[31700] in the majority of cases, the breadth, specific paths, and speed of transmission of content relate largely to the poster and her network in that given window of time[100500]. In cases in which the poster is essentially anonymous, the transmission characteristics of posted content—and especially images—often provides a hint as to if not the identity[70010] of the poster, at least their role or group[71100] affiliation(s.) To the extent that there are some particular transmission patterns of interest, some embodiments will choose to name them, and as appropriate designate images as showing the particular transmission pattern. Attributes include:
Name
UID[30010]
Definition
Display image for UI (optional)
Metric: There are a large number of potential measures of interest—and even more different ways of calculating them. However, for usability reasons it is not desirable to display an overly large number of them. Therefore most embodiments will support a "metric" knowledge object, which will generally have the following attributes:
Name
UID[30010]
Objects applied to
Definition
Type (optional)
Display in UI? (Boolean)
Other Supported Object Types: most embodiments will allow for the addition of new types of knowledge objects. For example, if it were to become useful to capture the notion of a supra-group-of-interest entity such as an "alliance," a new "alliance" objects with the appropriate attributes and behaviors could be added to the knowledgebase[30000] by a user with appropriate credentials.
Detecting Transformations of Image Components [400000]
At a high level, LICs [20100] are simply a set of DICs [73000] (or lower level LICs [20100]) that are considered equivalent—for example, the different methods for representing the ISIS lion image over time. However the problem of deciding which new image components [400000] are equivalent to older image components [400000] is quite complicated. This section describes a novel approach to this problem. The central idea is to maintain the relative positions of current classes of images [400900] as the DICs [73000] detected in newer images [400900] change. The relative position of an image [400900] class is measured by its separation from other existing class, so we seek to maintain the pairwise relationships between known image [400900] classes. The method is based on answering the question of whether structure is better conserved by deciding that a new DIC is logically equivalent to another DIC used in older images [400900], or whether the DIC is a new component [400000]. This question is only relevant for images [400900] that are similar to begin with. The answer to this question is used as the basis of clustering decisions. The method is based on the construction of an evidence graph [402000] that provides the context for automating these decisions.

The method relies on additional characteristics of and presence of elements [402200] related to images [400900] to provide a context in which two images [400900] with different DICs [73000] can be related. If many of the elements [402200] in the ensemble of relationships around a pair of images [400900] remain the same, even if the image component(s) [400000] of interest do not match up, it provides the basis for deciding that those image components [400000] should be considered equivalent. Often a use case is only concerned with a subset of image components [400000] in an image [400900], and in the general case there may be different subsets of image components [400000] relevant to different use cases.

Additionally, sets of images [400900] may be further sub-divided based on metadata [402300] and related elements [402200], for example it may be desirable to categorize images [400900] that have the same set of image components [400000] but are associated with two different authors or sources into two different subsets. To this end we define the concept of a "sketch [400800]" which consists of a set of image components [400000] along with any additional conditions (i.e. constraints) on which images [400900] it applies to.

We have defined the related concepts of direct image components, or DICs [73000], and logical image components, or LICs [20100]. For our purposes LICs [20100] are simply a set of DICs [73000] that are considered to play the same role in an image [400900]. Similarly to the hierarchical arrangement of higher level and more semantically rich image features [400850] based on lower level image features [400850] used in semantic image segmentation (e.g. image feature forests [400950]), we also allow LICs [20100] to be composed of lower level LICs [20100], based on similar considerations (lower level LICs [20100] appear in a larger number of images [400900], whereas combinations of those LICs [20100] into a higher level LIC [20100] appear in a smaller number of more semantically related images [400900]).

The graph [402000] system described here is specifically focused on the building up representations of LICs [20100] over time, and their use in classifying semantically similar images [400900]. The process that drives transformation of image components [400000] is the measure-countermeasure cycle, where an adversary who wishes to suppress the distribution of an image [400900] and related narrative creates and deploys a measure for detecting and tracking these images [400900]. The distributor then creates a new measure designed to evade the prior countermeasure. The intent is not to change the narrative so much as to find a way to continue distributing the narrative undisturbed, which for us provides the basis for an organizing principle. There is a very strong bias towards maintaining the current ensemble of image [400900] classes. Of course new image [400900] classes will be created over time, and others will fall away as their relevance fades (or it becomes too difficult to devise a countering tactic). But this bias means that image [400900] classes are not based on finding some global arrangement of images [400900] that minimizes some score (e.g. clustering), but rather on finding clusters that maintain some initial set of image components [400000].

The graph [402000] formalism we use here is that of a "hypergraph", which differs from a simple graph in that edges [402050] can relate any number of elements [402200] rather than just the pair of two elements that a simple graph would allow. There are several different approaches to graph clustering in hypergraphs, the general class of approaches we are interested in here are based on grouping vertices [402150] together in ways that minimize loss of information or structure in the graph [402000]. In a general sense, information is defined here as the extra structure imparted by the multi-way relations used in hypergraphs. The question of equivalence between two image components [400000] is recast as a question of whether that equivalence better maintains the overall structure of the graph [402000] or not.

Given that the system implements continuous monitoring of images [400900], every aspect of it must be implemented incrementally. This greatly affects the clustering approach and makes it desirable to measure similarity and change in a local "area" of the hypergraph [402000].

Finally note that the system described here is very general and need not be applied only to images [400900]. The core problem is determining equivalence of components of composite objects where in worst case the components must be treated as black boxes. Additionally the focus on social network and behavioral data are just types of data that are relevant to media posted online. The system in no way depends on those as specific data sources. It simply needs to be able to relate additional elements [402200] to the objects of interest.

Definition of the Hypergraph [402000] Representation

Figure 7:
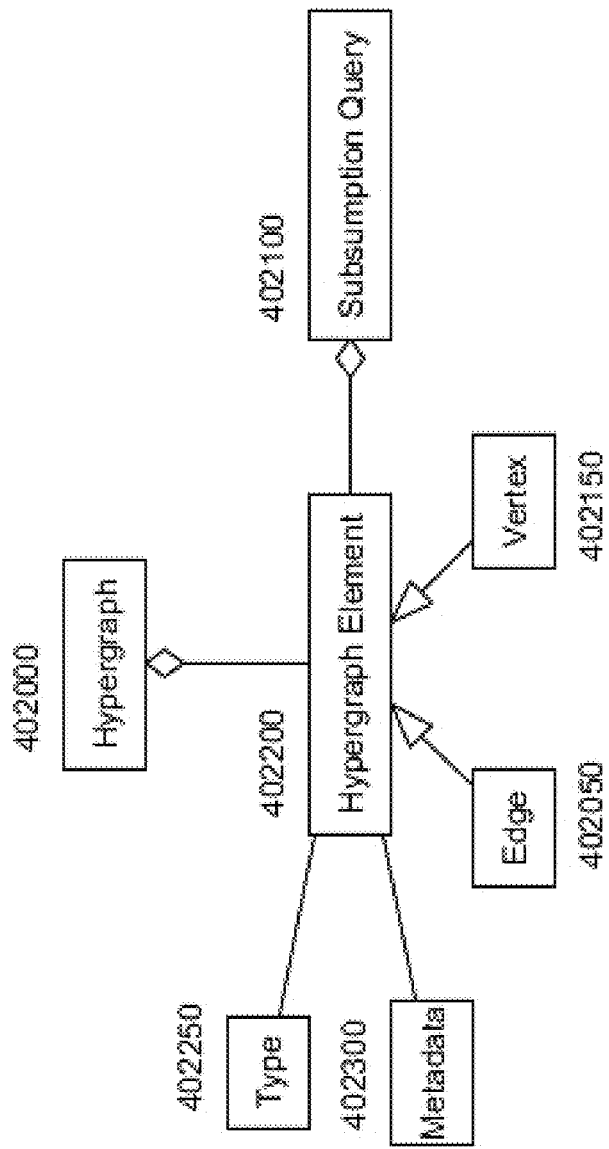
FIG. 7 is a block diagram which illustrates the hypergraph and its attributes.

Hypergraphs generalize simple graphs by allowing edges [402050] to represent multi-way relations between arbitrary sets of vertices [402150], representing objects external to the graph [402000]. Edges [402050] in this model are basically sets, and therefore the hypergraph [402000] can also be thought of as just a collection of subsets from some domain. In turn hypergraphs can be extended to allow edges [402050] to contain other edges [402050] as well as vertices [402150]. The embodiments describe here use a constrained form of this more general model, which is basically that edges [402050] can only contain lower level edges [402050]. In other words, it is not allowed for an edge [402050] to contain itself. FIG. 7 illustrates the relationships between these entities.

As with all things computational, this model can be represented in many different ways, including that of a simple graph. We use the hypergraph [402000] as a model because it makes many things simpler to represent, but the process described here could be implemented on any equivalent representation. The standard method for transforming a hypergraph to a simple graph is by construction of an equivalent "levi graph", i.e. a bipartite graph which represents the incidence of vertices [402150] on edges [402050]. On one side of the graph, each hypergraph edge [402050] is represented by one node.

The other "side" of the levi graph consists of all the vertices [402150] from the hypergraph [402000]. An edge [402050] is added to the bipartite graph between the node representing the hypergraph edges [402050] and the vertices [402150] it contains. For the extended model we use here, the incidence graph is n-partite for n levels edges [402050].

In the case where an edge [402050] contains edges [402050] of different levels, we can add dummy edges [402050], each containing the edge [402050] from the next level down. This equivalence does somewhat inform the approaches used here, as graph clustering is equivalent to finding "cuts" in the levi graph, e.g. edges that when removed split a connected set of nodes into two smaller connected sets. The cost of clustering could then be measured by a weight assigned to the edge [402050] or edges [402050] removed. Some of the cost measures here could be reworked into a weighting scheme on cuts.

Similarly to the different equivalent graph representations that may be used for the hypergraph [402000], some embodiments may not store the hypergraph [402000] as one data structure, or even as a data structure that reflects the structure of the graph [402000]. In particular, the approach used here will create some very large hyperedges [402050], and alternate implementations, such as a set of inverted indexes mapping from member elements [402200] back to the containing edge [402050] may be desired.

Figure 13:
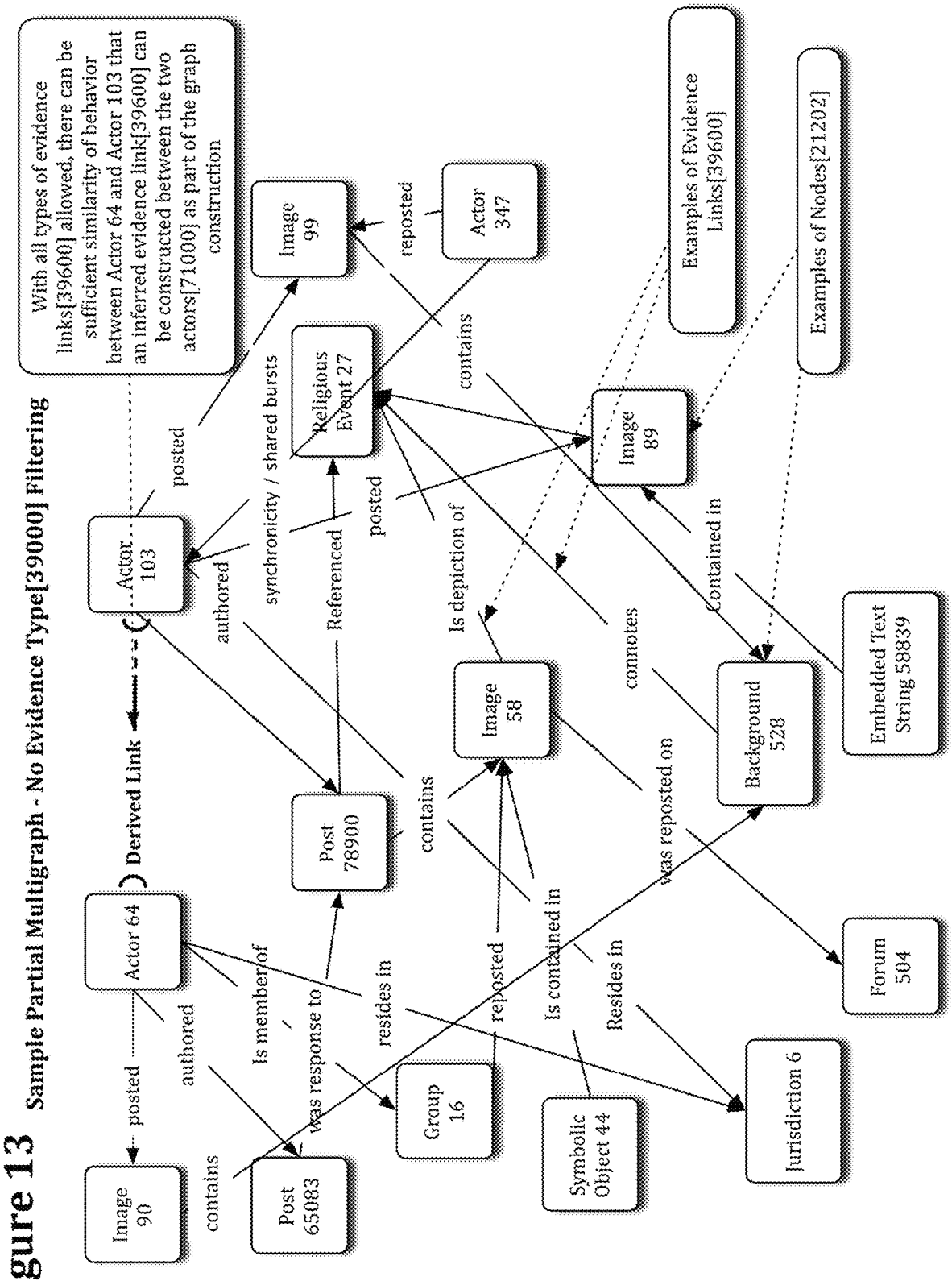
FIG. 13 is a block diagram which illustrates a sample partial multigraph—no evidence type filtering.

The hypergraph [402000] representation used here allows edges [402050] and vertices [402150] to be related to additional metadata [402300], in the form of attribute-value matrices (see U.S. Pat. No. 9,569,729 B1, FIG. 13 and related descriptions). Whether the hypergraph [402000] is a multigraph (can have two edges [402050] with the same elements [402200]) or not is an arbitrary decision, as the purpose for multiple edges [402050] is to be able to carry different metadata [402300] on each edge [402050]. This could equivalently be represented as a list of the different metadata [402300] values. The description below will assume that a multigraph is used.

The notion of graph queries [402100] is used throughout the description (see U.S. Pat. No. 9,569,729 B1 for a system that implements such a querying system, via subsumption queries [402100] on the metadata [402300] associated with edges [402050] and vertices [402150] in the graph [402000]). For our purposes the main feature of interest is that the queries [402100] can be applied either incrementally to new elements [402200] added to the graph [402000], or across the existing graph [402000] to return a stream of matching elements [402200].

Hypergraph Element Types [402250]

The use of metadata [402300] on hypergraph elements [402200] allows us to define the notion of types [402250], on edges [402050] in particular. There are several classes of edges [402050] discussed below, which can be distinguished by the metadata [402300] they carry and the types [402250] of elements [402200] that they contain. The discussion assumes that edges [402050] and vertices [402150] are tagged with a type [402250] as in the system denoted in U.S. Pat. No. 9,569,729 B1. Minimally, hypergraph elements [402200] have associated times of occurrence, or for higher level edges [402050], timespans covering the occurrences of elements [402200] contained in the edge [402050].

When defining graph elements [402200] there is some inherent ambiguity in how the element [402200] needs to be represented. Often when constructing hypergraph elements [402200], we want to capture relationships with arbitrary other elements [402200] in the graph [402000]. For example, it may be prior knowledge that an author is a member of a group such as ISIS. This may be information that is entered into the system manually rather than through the automatic discovery mechanisms presented here. There are two choices, either create a higher-level edge type [402250] that reifies the relationship, or add references to the associated graph elements [402200] in the metadata [402300] of the element [402200] being constructed. The first option has the disadvantage of creating extra edge types [402250] for representing a potentially large number of semantically distinct classes of relationships. However, it has the advantage of exposing those relationships in a regular way that can be examined and manipulated using normal graph [402000] mechanisms for search, traversal, and so on. The second option has the advantage of being less cumbersome and less limiting for representing arbitrary relationships. However, being able to use the metadata [402300] may require using subsumption queries [402100] against the graph [402000] store, or even custom code for handling different types of relationships. Ultimately, which approach to use is just an implementation choice to be made within an embodiment. We will define data elements as typically either an edge [402050], vertex [402150], or metadata [402300] but in actual implementation the representation may vary. Therefore, the definitions below are not meant to be limiting, but rather to establish names and concepts used in the system.

Figure 8:
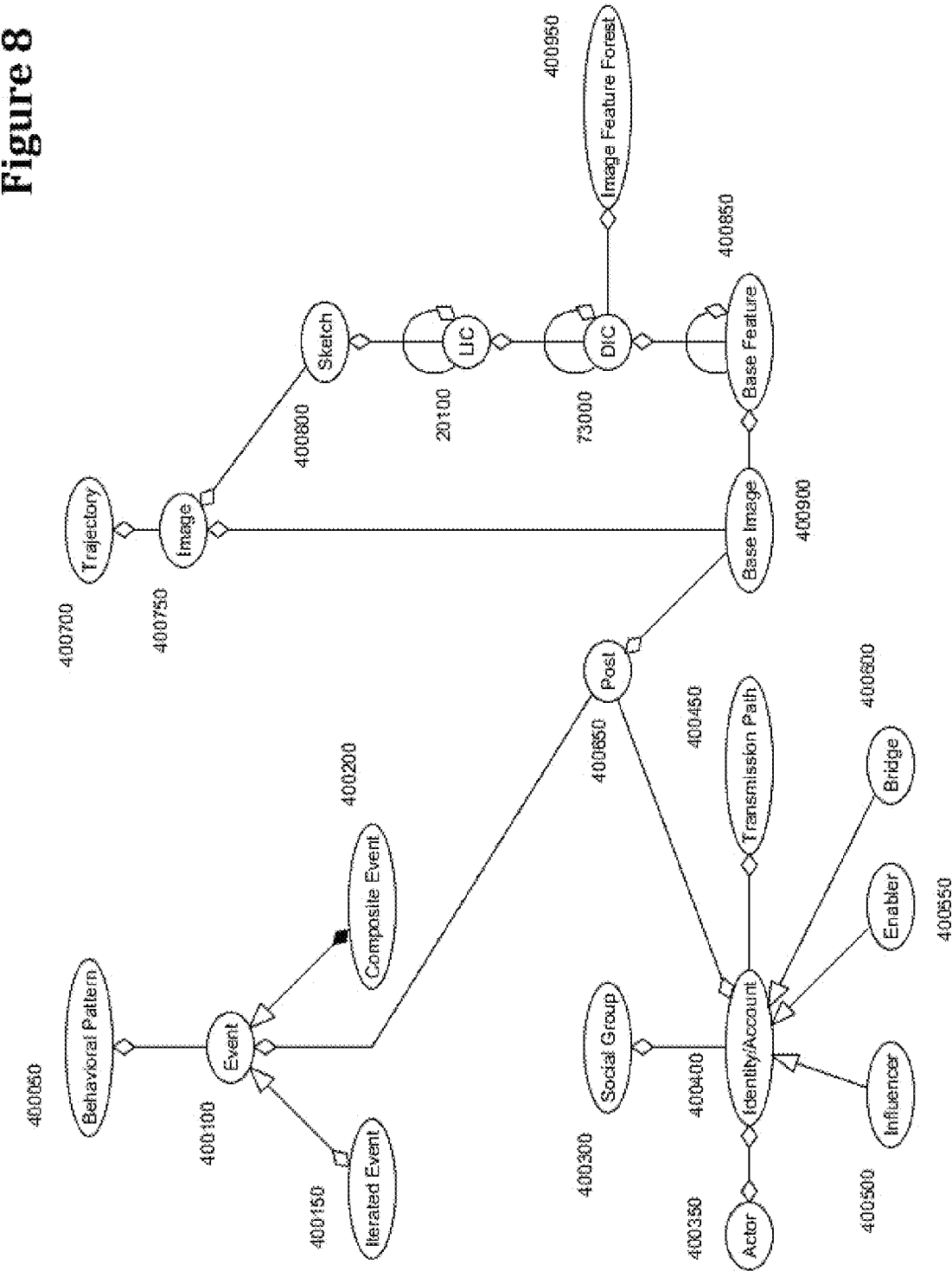
FIG. 8 is a block diagram which illustrates the clustering process.

FIG. 8 illustrates the relationships between the following element [402200] types [402250]. The arrows use UML conventions, i.e. an empty diamond at one end of the arrow indicates that the item at the other end of the arrow is an aggregate. A filled diamond indicates that the type at the other end of the arrow is a sub-component of a composite object. An empty triangle indicates that a type specializes or inherits from the type at that end of the arrow.

Data clusters are referred to throughout the system. A cluster is simply a higher level hypergraph edge [402050]. So, in some sense, most of the types [402250] discussed below are clusters.

References to external entities are generally defined as vertices [402150], with types [402250] designating whether they are image files [400900], image features [400850], posts [400650]], actors [400350], etc. These vertices [402150] are further described with metadata [402300] such as names, descriptions, text of a post [400650], URLs of source data, etc.

DICs [73000] can be represented as vertices [402150], unless image feature forests [400950] are stored in the hypergraph [402000], in which case DICs [73000] are edges [402050] bottoming out at the lowest level image features [400850].

LICs [20100] are edges [402050] containing DICs [73000] or other LICs [20100]

A Sketch [400800] is an edge [402050] that contains a set of LICs [20100] and other hypergraph elements [402200] related to the sketch [400800].

A higher-level image type [400750] is represented as an edge [402050] containing sketches [400800] and other hypergraph elements [402200] related to the base image file [400900].

Trajectories [400700] contain a sketch [400800], a set of images[400750] matching the sketch [400800], and other associated hypergraph elements [402200]

Actors [400350] are generally vertices [402150] and are meant to refer to an actual real-world person or group of some kind. Representation of accounts/identities [400400] is more complicated, as there can be a many-to-many relationship between accounts/identities [400400] and actors [400350]. Though not explicitly defined below, we can assume there are edge types [402250] in the system for expressing the relationships in each direction.

Social network groups [400300] and other structures are also just edges [402050], tagged with a type [402250] and usually containing accounts/identities [400400].

Events [400100] are typically vertices [402150], though in some special cases an Event [400100] may be an edge [402050] containing occurrences of a repeating event [400150], or smaller pieces of a composite event [400200].

Behavioral Patterns [400050] are generally edges [402050] that contain sets of events [400100].

High Level Description of the Detection Process

Figure 9:
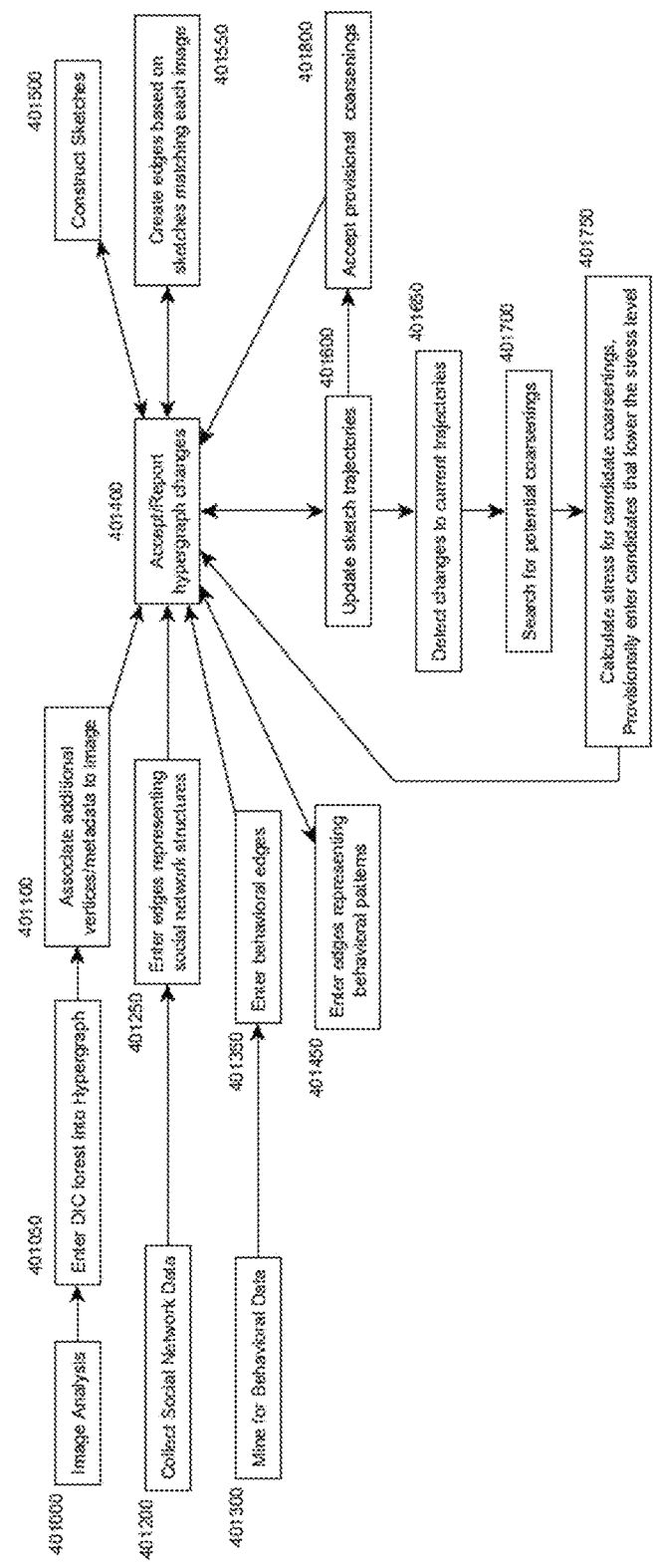
FIG. 9 is a block diagram which illustrates the behavioral pattern detection process.

This section is illustrated in FIG. 9. As the diagram describes an online system, boxes represent a process, i.e. an ongoing activity. Arrows represent the direction of the flow of data between processes.

[401000] Image Analysis: A subsystem which extracts image features [400850] and aggregates them into higher-level regions or components [400000] of the image [400900], referred to as direct image components or DICs [73000]. DICs [73000] within a single image [400900] are not typically required to be hierarchically related, though in some embodiments they may be. However, when considered across many images [400900], a natural tree structure emerges, where some images [400900] have a higher level DIC [73000] (or alternatively a set of DICs [73000]), and a larger number of images [400900] have lower level DICs [73000] that are sub-components [400000] of the higher level DIC [73000] (or alternatively, subsets of that set of DICs [73000]). Note that the methods of building a "forest" [400950] of such trees are not the subject of this invention; rather, what is relevant is that this forest [400950] represents possible relationships between images [400900] for later stages of the system.

[401050] Enter DIC [73000] forest into Hypergraph: As noted earlier, the hypergraph [402000] representation above can directly represent tree structures (and forests of such trees) of this sort. This means that an embodiment may simply store this data in the hypergraph [402000]. In most cases the system will determine the shared components [400000] separately, and then map the results to a more compact representation in the hypergraph [402000]. What is necessary for the system is that the possible relationships between images [400900] based on shared DICs [73000] are available in some form. This forest represents the possible sets of DICs [73000] that can be grouped together to describe images [400900], and therefore provides the basis for determining which DICs [73000] could be considered for grouping into LICs [20100].

[401100] Associate additional vertices [402150] and/or metadata [402300] to the image [400900]: Additional evidence may be derived from the forum the image [400900] is posted on, based on characteristics and the identity of the account used, any text associated with the image [400900], and any other contextual information derivable from the channel/media used to convey the image [400900]. For example, sentiment, characteristic phrases, named entities within the post, and so on.

How exactly this is to be represented in the hypergraph [402000] is somewhat arbitrary and depends on what works best with the other evidences collected. In one embodiment, vertices [402150] will be created for accounts/names and separate vertices [402150] for actors [400350] associated with different identities [400400]. Features derived from the text such as common references, signature phrases and so on will be represented as vertices [402150], whereas characteristics like sentiment will generally be kept as metadata [402300] (as there is a relatively small set of sentiments).

However, depending on how the stress measure is calculated it may work better to have it available as a vertex [402150] in lower level edges [402050]. Contextual information associated with a forum or channel may include things such as actors [400350] or groups [400300] known to be associated with the channel, the nature and type of the audience, historical data, and so on. The purpose of this process is to provide ways to associate images [400900] to the other data types collected.

[401200] Collect Social Network Data: As documented in a prior section, this is a fairly conventional process which consists of collecting information about names/accounts that can be linked to posts/messages from which images [400900] were collected. It involves spidering other names/accounts which are associated with the post via means such as commenting, forwarding, mentions of the content in other channels, and so on. In general, it is desirable to follow these links out through paths of at least 2 steps. Since the set of related elements [402200] can get rather large, this collection may be limited by recency, or sampling a subset of possible links or other means.

[401250] Enter Social Network Structures into Graph: As with image data, the prior social network data may be entered into the hypergraph [402000] directly, or handled separately with just the resulting structures of interest to be stored in the hypergraph [402000]. Again, social network analysis will not be covered in any depth here; rather we are interested in various relationships (represented in graph [402000] structures) that can be found in the larger network. The most obvious classes are simply the groups [400300] contained within the surrounding network, these can simply be represented as edges [402050] containing actor vertices [400350]. We are also interested in some of the standard categories of actors [400350] such as influencers [400500], enablers [400550], bridges [400600] between social groups [400300], etc.

Actors [400350] serving as bridges [400600] between social groups [400300] are of particular interest and the relationship may be less direct than simply being a member of both of the two groups [400300]. For instance, an actor [400350] may have a close relationship with an actor [400350] from a different group [400300], without himself being a member. There may be cases, particularly with the kinds of use cases discussed here, where the bridge [400600] between two groups [400300] is a conduit or path [400450] of several actors [400350], or where the bridge [400600] is not directly observable. In some cases, the fact that some actor [400350] serves as (part of) a bridge [400600] may require more than just social network data to discover; it may require something like detection of patterns [400050] in behavior and/or the appearance of data over time.

For example, if it can be established when an actor [400350] actually read or interacted with some image [400900] or narrative and could establish a repeated pattern [400050] of that image [400900] later being posted by a different actor [400350] in another community with a more or less consistent and short time delay, that is very suggestive of either some non-observable relationship between two different actors [400350], or the use of different identities [400400] by the same actor [400350]. This kind of analysis shades into the behavioral pattern [400050] detection mentioned below.

Detection of synchronization of behavior in time is a potentially rich source of actor [400350]-actor [400350] social relationships. We are also interested in subnetworks of stronger interpersonal relationships within a community, established by examining additional kinds of data in addition to the purely graph structure-based analyses of social network approaches, such as the nature and tone of observable interactions between actors [400350], the consistency of interactions over time, and the extent to which a similar relationship can be seen in different channels/forums/groups [400300] (to the extent that the different accounts/identities [400400] can be determined to be associated with the same actor [400350]). These additional categorizations will generally be recorded as additional metadata [402300] on edges [402050] containing actors [400350] and other groups [400300] of actors [400350].

Mine for Behavioral Data: Collect data about events [400100], each related to one or more elements [402200] in the hypergraph [402000] (for example, actor vertices) [400350]. Typically events [400100] will be defined by a type [402250] (is the event [400100] an action, or a change in some process, or a real world event, etc.), a time of occurrence, and elements [402200] related to the event [400100] (typically actors [400350]). The time of occurrence requires special mention, We follow the conventions of grammatical aspect in linguistics, which expresses how the action, event, or state denoted by a verb extends over time. Aspectual categories allow for distinguishing unitary events [400100] occurring at a point in time, from events [400100] that occur within a bounded time span, from events [400100] that occur repetitively, from events [400100] that are ongoing and unbounded, etc. Some of these categories are obviously less useful for our purposes, such as progressive events [400100]; however they can all be represented fairly straightforwardly in the hypergraph [402000] representation used here. Aspect will typically be represented in metadata [402300], but some embodiments may choose to represent repetitive events [400150] with a specific edge type [402250] relating different instances of the event [400100].

[401350] Enter Behavioral Edges [402050] into the graph: Encode events [400100] as edges [402050] entered into the hypergraph [402000]. This step is listed separately as some embodiments may require that event [400100] data collected from different sources, or at different times, be collated in order to populate the event [400100]. As a simple example, the chosen representation of a broadcast event (such as a tweet or a forward on twitter) may require spidering possible recipients for evidence that they read/interacted with it. If the event [400100] is considered to be a transaction between a sender and receiver that is only considered complete if the receiver does something with the message, then the system may have to collect data from a number of accounts before the events [400100] can be discovered and fully populated. Events [400100] will be represented as vertices [402150] in the hypergraph [402000], but will be entered with an edge [402050] that relates the event [400100] to associated elements [402200], and which contains the full representation of the event [400100] (if for example the event [400100] is represented as several nodes, as in the repetitive event example above), and appropriate metadata [402300] distinguishing the specific instance of the event [400100] (such as time and/or location of occurrence).

[401400] Accept/Report Hypergraph [402000] changes: The actual hypergraph [402000] representation may vary between possible embodiments, as indicated above, but since the system represents an ongoing process we assume an API to the graph [402000] that accepts changes to the hypergraph [402000]. Committing those changes in most embodiments generates messages describing those changes and dispatches them to interested processes. A more detailed description of such an architecture can be found in U.S. Pat. No. 9,569,729 B1. The main point is that the following processes are driven by changes to the graph [402000], and each process may provide a query [402100] used by the dispatcher to decide which change notifications are sent to that process.

[401450] Enter edges [402050] representing behavioral patterns [400050]: Since behavioral patterns [400050] may require analysis of temporal patterns contained in associated graph elements [402200] referenced in the behavioral edges [402050] entered in [401250], this is a separate process that awaits notification of changes in existing elements [402200] associated with existing events [400100], or the addition of new elements [402200] that can be associated with those events [400100].

The general topic of detecting behavioral patterns [400050] is addressed in U.S. Pat. No. 9,569,729 B1. Briefly, they consist of a relationship between a set of events [400100] that present in a patterned way over time. The simplest class of such patterns [400050] are synchronizations, i.e. a set of events [400100] occurring at the same time or within a sufficiently narrow time span. As with the other patterns [400050] mentioned here, if a pattern [400050] is detected once or a small number of times then it can't be distinguished from random chance. If a pattern [400050] presents repeatedly, and consistently (i.e. without a significant number of non-patterned relationships between those same events [400100]) it is much less likely to be due to chance. In order to talk about repeating instances of a pattern [400050], however we need to establish criteria by which two sets of events [400100] can be considered instances of the same pattern [400050].

Determining whether two sets of events [400100] are both instances of a particular pattern [400050] requires that we have a method for determining that two sets of events [400100] are equivalent. At the most basic level, patterns [400050] are based on repetition, and therefore we expect the two sets to have equivalent types [402250] and numbers of events [400100]. This relationship may be more complicated, however. In the most general case, we need to be able to establish some correspondence between the two sets. For example, in some cases it may be okay if there are different numbers of events [400100] of a certain type [402250] between the two sets.

For computational feasibility, the system uses a pattern [400050] definition which provides requirements for a pattern [400050] of interest, in essence a query [402100] as used in other parts of the system. For example, the system might define a pattern [400050] where events [400100] are all related to one of a proscribed set of actors [400350] and are of a certain type [402250] (or set of types [402250]), have the same aspect. These definitions can themselves be entered into the graph [402000] with higher level edges [402050] (decorated with metadata [402300] that define the pattern [400050] membership rules). Possible mechanisms for pattern [400050] discovery are described in U.S. Pat. No. 9,569,729 B1: the additional point here is that the pattern [400050] definitions described here can be used as additional constraints. Where exactly the constraints are used in the process of pattern [400050] detection depends on the approach used. The underlying purpose is to vastly reduce the search space of candidate event [400100] sets.

Other forms of patterns [400050] may consist of events [400100] I and associated actors [400350] that repeat in a sequence or some other partial order. This might represent a transmission [400450] of an image [400900] through multiple channels and intermediaries—for example, if an actor

[400350] is a member of two communities and transmits image [400900]s and related narratives presented in one community to another (or to some intermediary that transmits the message to another community.)

Once candidates are detected that match a pattern [400050] definition in the hypergraph [402000], they will be entered as new edges [402050].

[401500] Construct sketches [400800]: While sketches [400800] are in some sense clusters, the intended use cases are narrower and more well defined than what would result from more generalized clustering. For example, we might want to track sketches [400800] that represent common elements [402200] used by an author or associated with an organization. The space of possible sketches [400800] is already defined via the DIC [73000] forest discussed earlier. Thus the problem is more one of searching for sets of image components [400000] that match some criteria (such as being associated with a particular author) rather than one of generalized clustering. Sketches [400800] are defined to be groups of LICs [20100], so in order to bootstrap the process any DIC [73000] of interest will be wrapped in an equivalent LIC [20100] (i.e. an edge [402050] over DICs [73000] and/or other LICs [20100]). Because LICs [20100] are a series of DICs [73000] playing the same logical role, these initial LICs [20100] can be thought of as containing the initial members of sequences that may grow over time. In many cases a sketch [400800] may be initiated for some known use case, for example the use of lion images [400900] in ISIS-authored images [400900]. Most embodiments allow for manual definition of sketches [400800], as well as the specification of queries [402100] that define the criteria for sketches [400800] matching some particular use case. These queries [402100] are continuously matched to changes reported from the hypergraph [402000], and new sketches [400800] will be created as they emerge. A new sketch [400800] may later be merged with an existing sketch [400800] if an existing LIC [20100] gets updated with image components [400000] it contains.

[401550] Create edges [402050] based on sketches [400800] matching each image [400900]: An image [400900] matches a sketch [400800] if they both share the same LICs [20100]. When an image matches a sketch [400800] we create a new image [400750] edge and enter it in the graph [402000]. Note that two different LICs [20100] may be created for the same set of image components [400000] if they are meant to match in different contexts, e.g. additional criteria based on matching image [400900] metadata [402300] or based on related hypergraph elements [402200] such as an author or a social network group [400300] of users. Therefore, matches to a sketch [400800] require references to the exact same LIC [20100] instances (e.g. the same edges) [402050]. It is not enough that the image [400900] contains the same DICs [73000] as can be found in the sketch [400800], for example. This is because the sketch [400800] instance may itself contain additional metadata [402300] or be contained in other higher-level edges [402050] (for example edges [402050] relating the sketch [400800] to specific actors [400350]/groups [400300]/etc.).

This process acts on new images [400900] added to the hypergraph [402000] as they are reported, as well as on new sketches [400800] added. Note that in general we do not need to recheck older images [400900]/sketches [400800] stored on the hypergraph [402000] when their associated LICs [20100] change, as the LICs [20100] are updated in place. Depending on the timing of decisions to update an LIC [20100], there may be a need to recheck recently added images [400900]/sketches [400800] for matches. This search can be bounded by looking at the affected image components [400000]. For example, a relatively new image component [400000] that is added into an existing LIC [20100] only requires that images [400900] going back to the creation of the new image component [400000] need be checked. Since in practice it should be rare that existing image components [400000] with a long history are merged into new or existing LICs [20100], it is reasonable for an embodiment to place a limit of how far back in time it will recheck images [400900]/sketches [400800] for matches, or use some other mechanism for bounding the scope of the search.

[401600] Update sketch trajectories [400700]: As the image edges [400750] created in [401550] are added to the graph [402000], this process checks to see if they should be added to existing sketch trajectories [400700]. Since there may be multiple trajectories [400700] based on a sketch [400800], again based on additional matching criteria specified for the trajectory [400700], the main responsibility of this process is to check these additional criteria.

[401650] Detect changes to current trajectories [400700]: Changes to the current set of trajectories [400700] can happen in multiple ways, requiring different mechanisms to watch for those changes. A trajectory [400700] may become less active, or more active, for example. This requires that the process periodically recheck existing trajectories [400700] to look for changes in the rate of additions that are out of keeping with the current volume of image[400750] traffic. If a trajectory [400700] is not receiving updates, this may mean that usage of some image component [400000] has changed, and signals that the system should look for opportunities to update LICs [20100] appearing in the sketch [400800]—for example, if the ISIS lion images [400900] were updated to some textual or more abstract representation. Updates to LICs [20100] will then allow containing sketches [400800] to match additional images [400900]. If a trajectory [400700] gets a surge of image [400750] matches, it may mean that it is affected by recent changes to LICs [20100], and if those changes are still marked as provisional, to recheck their status. Trajectories [400700] formed from new sketches [400800] should trigger a check to see if they are not in fact a continuation of existing trajectories [400700]. The purpose of this process is to highlight starting points to use in a search for candidate LICs [20100] to use in the next coarsening step.

[401700] Search for potential coarsenings: "Coarsenings" of the graph [402000] are implemented by updating LICs [20100] to contain new image components [400000]. The effect of doing this will be to collapse distinct image [400900] classes (as defined by which images [400900] match a sketch [400800], and thus sketch trajectories [400700]). The purpose of this process is to find candidates that are the least likely to lead to information loss in the hypergraph [402000]. If an unrelated image component [400000] were to be merged into a LIC [20100], it may then cause affected sketches to match inappropriate images [400900]. This is a net information loss because we can no longer distinguish images [400900] that should be placed in distinct categories. On the other hand, if an image component [400000] is transformed and the relation to the prior image component [400000] is not captured in an LIC [20100], this also leads to a form of information loss, in that we can no longer relate images [400900] in the same category.

Candidates for coarsening are discovered by looking for images [400900] or higher level edges [402050] that contain those images [400900] that are similar to one another; in this case, we only care about similarity to candidates discovered in the prior process, [401650]. This reduces the computational load, and is justified based on the structure of the measure-countermeasure time windows. Most embodiments will make the assumption that when a measure for detecting a class of images [400900] is put in place by the adversary, distributors of image [400900] content develop countermeasures specifically so that they can continue to distribute that class of images [400900] and associated narratives.

This assumption allows two simplifications to the overall process. As mentioned above, we can focus on trajectories [400700] that are changing, as that indicates that we may be encountering a measure-countermeasure window. Additionally, we can make an assumption about locality. While we do care about the global state of the graph [402000], we assume that transformations can be detected by looking at local structure of the graph [402000]. Certainly real world actors that are implementing these changes are only aware of local effects. In any case, these two assumptions mean that we look only at similar elements [402200] to the candidates discovered in the prior stage. Looking on a broader basis may in fact prove harmful, in that changes are not motivated by some broader re-balancing of the graph [402000] and we may thus be adding irrelevant changes based on chance correlations of elements [402200] in the hypergraph [402000].

We do not, however, just cluster these elements [402200] on the basis of similarity. Instead we evaluate the effect of clustering them based on changes to the structure of the graph [402000]. This is covered in the next stage of the process.

[401750] Calculate stress measure for candidate coarsenings: The effect of the assumptions mentioned above leads to desiring the goal of maintaining the structure of the overall graph [402000] as much as possible. The stress measure defined here is a measure of (localized) changes in the structure of the hypergraph [402000]. Coarsenings that lower stress may be provisionally entered into the hypergraph [402000]; however additional constraints and heuristics may still apply. So only those candidates that pass any extra constraints are entered into the graph [402000]. These constraints may take the form of graph queries [402100] used throughout the system. Additionally, there may be coarsenings that are mandated or suggested by external knowledge sources (e.g. users of the system), called heuristics here but that is probably a slight abuse of the term. If an image component [400000] transformation is known, it may simply be added to the system via this coarsening mechanism. There may also be explicitly defined conditions that are deemed more likely to be transformations, such as images [400900] being associated with a known distribution channel for an organization like ISIS. These conditions are represented in the system as queries [402100] of the same form as used in other parts of the system, and are used to modify the similarity scoring discussed below. Other queries [402100] may be defined in some embodiments that mandate the addition of coarsenings when matched.

Stress is calculated as the net change in similarity scores between the tip of a trajectory [400700] (i.e. the most recent image [400750] additions) and the tips of other trajectories [400700] in the graph [402000]. The measure is similar to the notion of stress measures used in multidimensional scaling or MDS. The general form of the measure is based on sum of squares of the changes in similarity. The change is evaluated by comparing two different cases. The change in stress measurement is based upon considering the effects of adding the coarsening, versus the change in stress measurement caused by new trajectories [400700] added if the coarsening is not applied. These values may not be directly comparable, so different embodiments may use a scaling function or some other transformation to make the scores comparable.

A simple method looks at the effects of the local change, i.e. the change to the current trajectory [400700], without considering changes made to other trajectories [400700] (whether by the particular coarsening, or other coarsenings being considered within the same timeframe). Different embodiments may choose from a multitude of measures for accomplishing this comparison; what is significant to the invention is that the effect of adding the coarsening vs. not adding the coarsening be compared to decide which one best preserves the overall structure of the hypergraph [402000]. Note that this situation is very similar to Multi-Dimensional Scaling (MDS) calculations in that the structure is measured by relative positions of the trajectories [400700]. MDS consists of projecting a set of points from a high dimensional space to a lower dimensional space while preserving the relative differences between pairs of points in the two representations.

This situation is analogous in that we are considering "projections" of the set of trajectories [400700] formed by applying coarsenings or not. Techniques for calculating MDS, and approximations for performing MDS against larger data sets are good candidates for handling this problem.

Additionally, our ability to measure the amount of change caused by a coarsening may be limited by the amount of data that has been accumulated to this point. In order to better support this, some embodiments may choose to enter changes on a provisional basis, recorded via metadata [402300] recorded on LICs [20100] that have been altered by potential coarsenings, whereas others may schedule potential coarsenings for later evaluation after more data has been collected.

However, such provisional coarsenings offer a further complication to the overall process. Nonetheless, from the perspective of users of the system, the additional complications may be merited in the name of timely tracking of candidate images [400900] (rather than suddenly detecting a rash of relevant images [400900] when evaluation of a coarsening is delayed to a later point). If a coarsening remains provisional for some period of time, then other coarsenings are likely to accumulate each of those on a provisional basis. Since by definition, we don't yet know if the coarsenings will be accepted or not, this creates a set of alternate trajectories [400700] to compare against when calculating stress.

While we believe that in practice the set of trajectories [400700] will not be very large, this is a potential issue computationally. In the simplest case, the system can simply brute force it and calculate stress under all combinations of possible trajectories [400700]. In this case we can produce a distribution of stress scores when considering the coarsening applied or not, then compare the two distributions. In this case a statistical technique such as Student's t-test might apply (designating the configuration without the coarsening applied as the null hypothesis, for example). It should be noted that this test has variations that cover many, if not all of the considerations discussed here. The computational load may be reduced by sampling the set of other trajectories [400700] when calculating stress rather than considering all of them. This will depend on how many trajectories [400700] are active and other statistical considerations.

Different embodiments may also choose to employ techniques from multi-parameter optimization problems.

The actual similarity measure between edges [402050] is fundamentally based on comparing the elements [402200] contained by the edges [402050]. Different embodiments may choose from among a wide range of generally accepted measures. However, we note that large edges [402050] are useful for this task, as they allow for more points of comparison which can be retained around image components [400000]. Not all edge/vertex types [402250] are likely to be equally important, thus most embodiments will use some kind of weighting mechanism when calculating these scores. Different weights might be appropriate given the context of an edge, so in the most general case the system will defining different weight profiles for edges [402050] that match a graph query [402100]. This system also allows us to exclude edges [402050] that are not deemed comparable (e.g. no weighting profile can be found for them).

[401800] Accept provisional coarsenings: If provisional coarsenings are used in the system, they are scheduled to be evaluated after some period of time to determine if they are accepted or not. This process is similar the prior step and may in fact be implemented in that process. It is listed separately in the diagram because it is a logically distinct step.

Construction of a Multi-Evidence Ancestry Graph (Certain Embodiments)

In some embodiments, the system[100] begins reconstructing the ancestry[180000] of an image[72000] by establishing numerous kinds of relationships including but not limited to those described in the "Meta data" section such as—the application of different filters—image cropping—composition of additional/fewer external visual elements—resolution changes—modification of borders[80110]—insertion of a signature[77000] or logo[76000]—reference background image[73120].

In other words, the system produces a directed acyclic graph (DAG)[25130] where the nodes[21202] are all images [72000] or image components[400000] in the analyzed dataset[5105] and the edges[21201] link one or more images [72000] (called Parent Images[180100]) to another image [72000] (called Resulting Image[180200]) which is the result of their combination. Thus an image[72000] can have no Parent Image[180100] (if it is a root node[180105], i.e. original content[1 70100] spread by its presumed author [75205]), or a single one (if it is directly derived from it, e.g. by dint of a filter) or more than one (if it is a composition of several images[72000]).

Note that any Parent Image[180100] can be subjected to one or more basic transformations[73010] which produce a semantically similar image[180500], including those producing a near-duplicate image[180600] (format change, resolution change, etc.) and those producing a different but similar scene (translation, rotation, scaling, filter application, etc.)

a. Image Embedding[181000] In this case, the Resulting Image[180200] is derived from a Parent Image[180100] providing the background picture[73120] (called the Background Image[180400]), and from another Parent Image [180100] which is layered on top of this background [73120], for example as a logo[76000] or an otherwise embedded image[181005] occupying more space, called the Foreground Image[181100].

b. Image Extraction[182000] This case is the reverse of Image Embedding[181000]: the Resulting Image[180200] is derived from a single Parent Image[180100] (called the Outer Image[180300]) by extracting a sub-image[72001] from it.

c. Image Captioning[183000] In this case, the Resulting Image[180200] is derived from a Parent Image[180100] providing the background picture[73120] (called the Background Image[180400] as well), and from a text string formatted in a certain way (font[74200], size[74256], color [74254], styling, and other effects[74258]) superimposed on top of the background[180400], called Parent Text[74120].

The image can also be subjected to more complex transformations[73010] or LIC's[20100], for example the substitution of one visual symbol[82000] for another (e.g. a lion for a tiger) or a transformation[73010] on only a discrete visual element (e.g. a detailed line drawing of a lion replaced with a highly stylized one of only a few strokes.

The default embodiment of the system[100] contains an image ancestry construction component which works in three sequential steps on a batch of items:

(Note that in some embodiments, this will be considered part of the graph)[25130], and so is not separately depicted in the system pipeline figure (FIG. 1).)

Step 1: Construction of the Image Semantic Forest[25210]

Figure 10:
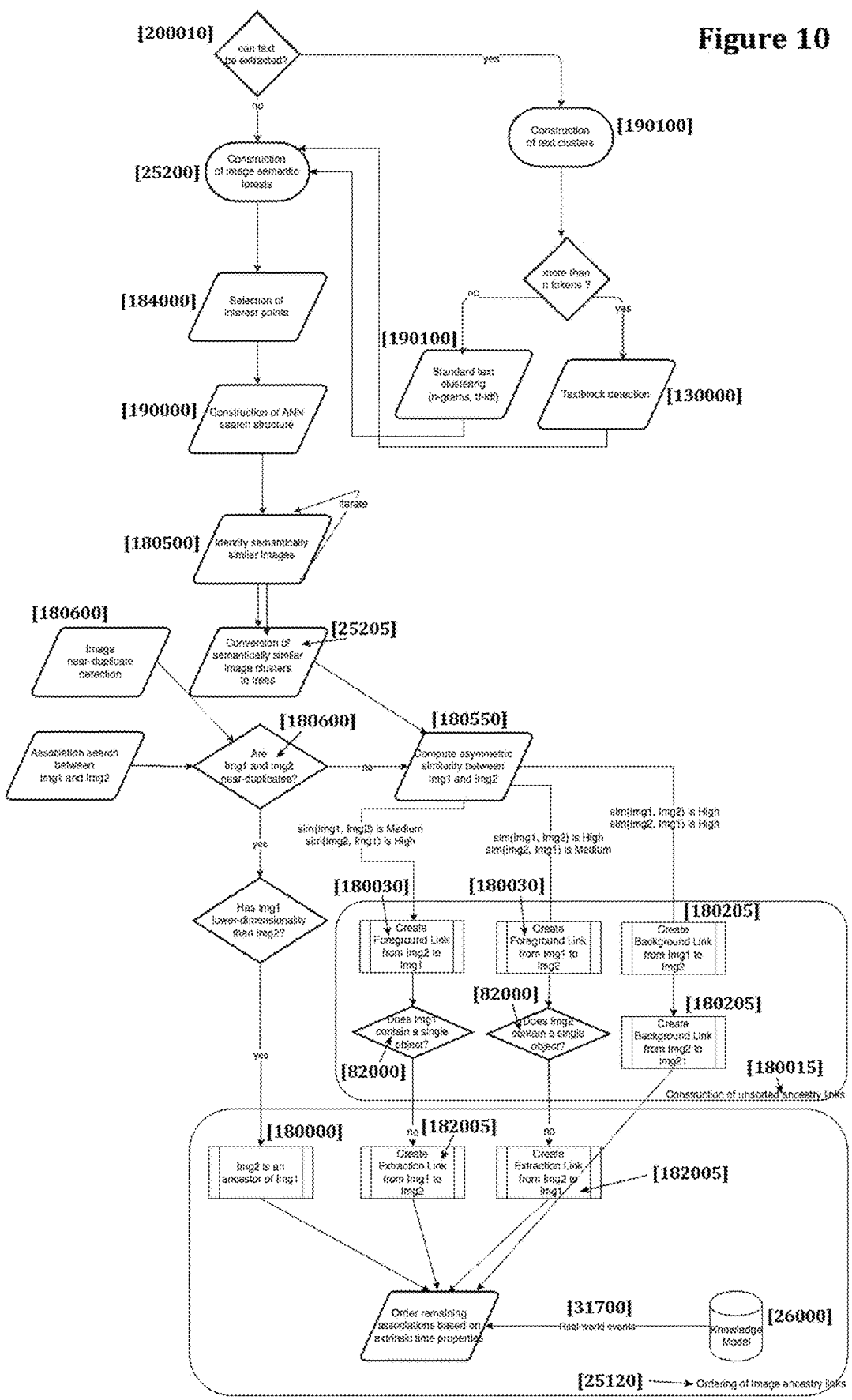
FIG. 10 is a block diagram which illustrates the construction of image and unsorted ancestry links.

As illustrated in FIG. 10, this step operates on the purely visual part of each item[5110], ignoring any text[80010] that may be embedded in the images[72000] or other type of content or meta-data. It aims to group all images[72000] in the dataset[5105] into a number of trees[25205] of literally similar images[72000] as defined by shared regions of high similarity according to the definitions in this document, which are all derived from the same image[72000] located at its root. One embodiment of the invention consists in the following sub-steps:

1.a) computing interest points[184000] in each image [72000], as well as a rotation- and scale-invariant local feature descriptor[185010] around each interest point [184000] (for example, Hessian-based detectors such as the Speeded-Up Robust Features described in US2009238460 (A1)—ROBUST INTEREST POINT DETECTOR AND DESCRIPTOR)

1.b) building an efficient structure for approximate nearest neighbor search[190000] using these features[185000] and an asymmetric distance between images[72000] (for example using Herve Jegou, Florent Perronnin, Matthij s Douze, Jorge Sanchez, Patrick Perez, et al., Aggregating local image descriptors into compact codes. IEEE Transactions on Pattern Analysis and Machine Intelligence, Institute of Electrical and Electronics Engineers, 2012, 34 (9), pp. 1704-1716.10.1109/TPAMI.2011.235. inria-00633013)

1.c) finding approximate nearest neighbors[190000] of each image[72000], for example by a single-shot search or using an iterative search while filtering out near-duplicates [180600] after each iteration, in order to produce a broader set of candidate semantically similar images[180500]

1.d) optionally, converting each cluster[190100] of approximate nearest neighbors[190010] into a tree[25205] based on their dissimilarity measures[180550] (for example, using the Automatic Oriented Kruskal algorithm which distinguishes between near-duplicate images[180600] and semantically similar images[180500] that have higher dissimilarity). This operation has the benefit of providing the original variant from which all near-duplicates[180600] of a given image[72000] are derived, as well as reducing the number of comparisons[190200] to be performed during construction of the Multi-Evidence Ancestry Graph[25120].

Step 2: Construction of the Textblock[130000] or Other Text-Related Clusters[190100]

This step operates on the textual part of each item [5110]—if text is present—whether this is text resulting from OCR'ing an image[72000], extracted from the metadata[34900] embedded in the image[72000], or from extrinsic data[6500] collected and extracted along with the image [72000].

Most embodiments will have a number of different approaches to try, either in parallel (so as to enable a 'most votes wins' or similar scheme,) or in series based on the approach that is the likeliest to produce the correct result. For example, in the case of text that has more than N tokens—N being a parameter configurable by language—a preferred embodiment avails itself of Textblocks[130000], which are defined in U.S. Pat. No. U.S. Pat. Nos. 9,569, 729B1 and 7,143,091: "Textblocks consist of the maximum contiguous sequence of sentences or sentence fragments which can be attributed to a single author. In certain cases, especially emails, a different author may interpose responses in the midst of a textblock. However, the textblock retains its core identity for as long as it remains recognizable."

Upon OCR'ing and text extraction from each image's [72000] metadata[34900] and associated data, Textblock Patterns[130000] are mined, and a cluster[190100] is formed for each one, which comprises all Textblock [130000] Instances occurring in an item[5110] for this pattern.

For shorter texts (<N tokens), other types of clustering approaches are likely to be more appropriate. Different embodiments may at any rate take different clustering approaches.

Step 3: Construction of the Image Ancestry Graph[25120]

3.a) Derivation of Unsorted Ancestry Links[180015]

This step establishes links[180015] between items beyond those linking a pair of semantically similar images[180500] (derived from step 1) and those linking two Textblock Instances[130000] of the same Textblock Pattern or other type of cluster[190100] (derived from step 2). In other words, it computes the compositional links in addition to the already computed derivational links[180015].

In the default embodiment, the types of such links include but are not limited to: a. Image Embedding[181000]— Background Link: Background Image[180400]→Resulting Image[180200]—Foreground Link[180030]: Foreground Image[181100]→Resulting Image[180200] b. Image Extraction[182000]—Extraction Link[182005]: Outer Image[180300]→Resulting Image[180200] c. Image Captioning[183000]—Background Link[180205]: Background Image[180400]→Resulting Image[180200]—Captioning Link[182010]: Parent Text[74120]→Resulting Image [180200]

Among these, Captioning Links[82010] are directly produced by OCR and data/metadata extraction. The other link[21201] types are computed using a local dissimilarity measure[180550] to compare images[72000] according to their shared content: heuristically, the similarity between two images[72000] involved in the links[21201] in some embodiments is clustered in three value ranges depending on the amount of shared content in proportion of the first image's[72000] content size: High when the shared content comprises most of Img1, Low when they share almost no content, and Medium when they share a non-trivial part of Img1's content. Note that different embodiments may use very different weighting schemes[190210] to determine how much content is shared. While many will opt for the literal size of the image region, others may weigh factors including but not limited to: the assessed real world importance [82000] of each region, different aspects of each regions relative visibility (for example, high vs low visual contrast,) and position[81024] within the image[72000].

The following kinds of rules can be used by different embodiments to infer some additional link[21201] types:— for example when both sim(Img1, Img2) and sim(Img2, Img1) lie in the "high" range, an undirected Background Link is created between them as Background Image [180400] and Resulting Image[180200]; the direction of this link will be determined in the Item Sorting[190220] step.— when sim(Img1, Img2) lies in the medium range and sim (Img2, Img1) lies in the high range, a candidate directed Foreground Link[100030] from Img2 (as Foreground Image [181100]) to Img1 (as Resulting Image[180200]) is created, and a candidate directed Extraction Link[182005] from Img1 (as Outer Image[180300]) to Img2 (as Resulting Image[180200]) is created; one of these links[21201] will hopefully be pruned in the Item Sorting step[190220].

Similarity measures[180550] at this point can be defined in a number of ways. However they need to be more carefully designed than in step 1 where all interest points [184000] in the pairwise comparison[190200] were considered. In one embodiment, the interest points[184000] are first filtered to retain only those interest points[184000] which are geometrically consistent with the matching point [190215] in the other image[72000] with respect to a single scaling[200010], translation[200020] and rotation matrix [200030]; the convex hull[190225] of the retained interest points[184000] is computed for each image[72000], and the mutual information[190230] between the pixel values of the two color-corrected areas is used as similarity measure [180550] between the two images[72000]. Using such an asymmetric similarity measure[180550] also provides directed ancestry links[180015], i.e. using the typical mutual information (MI)[190230] definitions, if the MI[190230] between Img1 and Img2 is larger than the MI[190230] between Img2 and Img1, then Img1 is likely the parent of Img2. The following section on item sorting[190220], however, describes other methods of orienting the edges between items of various types—not just images[72000].

3.b) Ordering of Image Ancestry Links[180015]

The Image Ancestry Graph[25120] construction relies on determining a partial sort order on all items in the dataset [5105]: if Item1 and Item2 are linked through one of the aforementioned relationship types, ultimately either Item2 is considered to result from Item1 (potentially combined with one or more items) or Item1 is considered to result from Item2. (As noted elsewhere, most embodiments will allow for the edge case in which directionality/causality is not safely inferable without additional evidence. This situation is most likely to occur when there is either no date and time stamp information available or directly inferable, or what is available is believed to be unreliable.

It has been thus far assumed that only intrinsic properties of images[72000] are used in order to determine that order. For example, a typical asymmetric similarity[180550] measure between images[72000] as described above will have the property that a lower-dimensional variant of an otherwise identical image[72000] will be deemed the Resulting Image[180200], rather than the inverse relationship. Some embodiments of the invention will also adopt more refined heuristics. For instance, if an image[72000] Img1 only contains a single object[82000] (as determined by any state-of-the-art object detection algorithm), and the graph [25120] construction described above has created a candidate Foreground Link[180030] from Img2 to Img1 and a candidate Extraction Link[182005] from Img1 to Img2, then the former candidate is deemed the likelier alternative since it is very unlikely that only part of a single object[82000] will be extracted to produce a meaningful Resulting Image [180200].

Some other properties that can help assign a direction to undirected links[21201] between items are extrinsic, and thus applicable not only to images[72000] but also to textual content[45107] (for which all links[21201] derived by Textblock detection[130000] or alternative methods are undirected, since absent any further information it is impossible to assign the direction even if one Textblock instance is a strict superset of another Textblock instance. For example, the latter can be an extract[200010] of the former, or the former an expansion[200020] of the latter). Those extrinsic sorting[190220] properties include, but are not limited to:—A prominent extrinsic sorting[190220] property is the timestamp of an item: if Item1 precedes Item2 according to their timestamps and they are connected by a direct link [180015] within the Multi-Evidence Ancestry Graph [25120], then Item2 is derived from Item1 (and potentially from another Parent Item[74120][180100]).—Another extrinsic sorting property[190221] is the mention of an external real world event[31700] indexed in the Knowledge Model[26000] described elsewhere in this document or ascertainable by pulling from or spidering any reliable source[5005], which provides a lower bound on the actual creation time of the item (similarly to the newspaper displayed on a hostage photograph): if another item has a timestamp which precedes that external event[31700], this provides the missing direction for the link[21201]. Similarly, a reference to a recognizable event[31700] as being in the future—for example the 2020 U.S. Presidential election—in accompanying metadata will in many embodiments be considered as evidence of an upper bound in time.

Step 4: Construction of the Multi-Evidence Hypergraph [25102]

In addition to the image-specific evidence links[39600] constructed above (including those related to text[200010] extracted from an image[72000]), other features[185000] of the items[5110] are used to construct evidence links[39600], including both direct features[73000] and derived features [20100] as previously defined.

In a preferred embodiment, all those links[39600] will feed into a hypergraph model[25102] as described by U.S. Pat. No. 8,887,286 B2, which is here augmented with the image-specific evidence types[39000] and ancestry relationships[180015].

3.a) Firstly, all evidence links[39600] mentioned in U.S. Pat. No. 8,887,286 B2 can be leveraged by the present invention, for example: actor influence, causal relationship—shared periodic[24000] or other synchronous pattern as inferred from the item timestamps (e.g. the image[72000] posting dates).

In most embodiments, information from the knowledge model[26000] is leveraged by the Machine Learning component[10000] to evaluate the importance of an image [72000] based on a current or historical event[31700] that it seems to be depicting. As an example, if an image[72000] is posted on or near a historical date[31700] (within a certain regional or religious culture) and possesses other relevant features[185000] such as text[270050] and/or imagery [270100] that is related to the event[31700] in question, the image[72000] will be deemed much more important by the system[100]. Many embodiments may consider ranges of importance levels as an evidence type[39000] in its own right.

Another, more sophisticated example is the recognition of sacred places or events[31700] within a particular cultural tradition or religion. Some of these places will be detectable by standard Computer Vision algorithms because they correspond to easily identifiable buildings, landscapes or events [31700] (e.g. Jesus on cross), while others will be mentioned by name or reference. Text-only references are detected by an NLP component. A third category will be very indirect references[290050] and thus, depending on embodiment, will be captured either/both by an ML algorithm trained on carefully tradecrafted annotations or a symbolic system.

Actor relationships are an important source of evidence. This includes but is not limited to: references to another actor[71000] in a given author's[75205] posting[34105] (whether the reference is found in metadata or embedded in the content), as well as significant volumes of image or textual content, "important" content posted, or synchronicity [71250] of behavior shared by two or more authors[75205]. In one embodiment, the system[100] computes an influence measure from the ancestry relationship[180015] among shared content, similar to the Actor Influence Analysis [22000] procedure described in U.S. Pat. No. 8,887,286 B2:—if most images[72000] posted by Actor1 [71000] originate from images[72000] already posted by Actor2 [71000], this increases the influence exerted by Actor2 [71000] over Actor1[71000]. Similarly to the previously cited invention, if Actor2[71000] takes a proverbial leave of absence from a social network[23000] by stopping posting images[72000] deemed of importance by the system[100], and this leaves to Actor1[71000] at least decreasing the frequency of shared posts[34105], this further bumps Actor2's[71000] influence level—finally, if a change in the profile of Actor2[71000]'s content[72000] is observed, such as switching from the use of lions as a particular symbol [82000] to another symbol[82000] or logo[76000], and this change is followed by a similar change in Actor1[71000]'s content[72000], the influence levels are adjusted accordingly.

3.b) Other evidence links[39600], introduced by the present invention which deals with an image dataset[5105], include but are not limited to:—how stylized an image [72000] is (for example is it a rough sketch of a lion, or a high-resolution photograph of an actual animal)—the concepts[20100] extracted from an image[72000] (for example if a highly symbolic place has been used as the background of the image)—choice of the color palette[81000], both for an image[72000] and for the text[80010] layered over it—direct features related to text[80400] found in the image [72000], such as font color[74254], font type[74200], font size[74256]—features derived from text[80010] present in the image[72000] and not trivially recognizable, such as lack of OCR' ability[21001], whether determined—either by an OCR algorithm directly (whereby this algorithm has detected the presence of text but has been unsuccessful extracting it)—or by a human analyst[50310] who was able to spot text content that was particularly well blended into the background image[73120] (for example, obscure graffiti or elaborate calligraphic writings)—choice of language or of multiple languages—source of the text (if the author[75205] of a citation[75200] is explicitly given in the text, or if it can be derived from the Knowledge Model [26000])

3.c) Further computations on the hypergraph[25100] relating to trajectories are as defined in the preceding section.

Color Palette[81000]—Related Assessment

Color palette[81000] identification will be performed in most embodiments according to existing techniques. These include, but are not limited to the following: L1 norm, Jaccard similarity, and bin-to-bin vs. cross-bin comparisons.

Almost all embodiments will support color palette[81000] calculations over both the entire image[72000] as well as specific regions, layers, or image components[400000] of it. These regions can be identified semantically or literally. Possible region definitions include, but are not limited to: the image border[80110], the smallest regular region that contains any form of text or any other recognizable kind of superimposed object, any kind of recognizable object[82000] logically in the originating image[72000], the region defined by a bounding box with a non-zero-width stroke, a region defined by coordinates, a region defined by discontinuity of the pixels[80128] in one or more dimensions of color or texture with adjacent regions, only background colors, In most embodiments, one or more color palette-related features[S1000] are calculated. In some embodiments for example, the CIELab color space is used so that a change in the encoded color value corresponds to a similar perceptual judgment. In other embodiments, both color and texture are used, so as to make available measures of overall color, directionality and orientation, regularity and placement, color purity, complexity and heaviness.

Different color schemes[81000] (whether just color palettes[81000] or color-texture combinations) may correspond to different identifiable semantic categories, for example cultural or geographical ones; they may also relate to branding (for instance, it has been shown that the color schemes of airline logos are highly clustered per geographical region and quality of service). Some embodiments may choose to use these different categories as evidence links[39600] in the hypergraph[25102] (multigraph[25110], or similar structure.) The system[100] leverages these properties of color schemes[81000]:

In an unsupervised manner via the inference engine[15000] or similar mechanism (which will group authors[34106] according to their choice of dominant color, also strengthening the associations between original content[170100] and re-used content[170150])

In a supervised manner via the ML component[10000] (which will outline branding efforts, for example by a terrorist organization trying to capture the attention and later the loyalty of its recruits, while avoiding too explicit recruiting messaging that might get filtered or censored).

Derived Sentiment[350000] Feature

Images[72000] that can be associated with a recognized event in many embodiments can also be assigned one or more related sentiments, specifically sentiments[350000] that are being imputed by the poster (as opposed to any sentiments inferable purely from the contents of the image[72000], for example someone crying.) It should be noted that as more forums move to the use of "hate speech" dictionaries and similar means to block text that expresses certain verboten beliefs, the expression of such beliefs and sentiments is likely to increasingly shift to image form.

In many of these embodiments, a desired sentiment partitioning is specified in the knowledgebase[30000] among the attributes of the event This is both to allow control of the level of granularity of sentiment analysis on a per-case basis, and because for most events, only a subset of sentiments are likely to be relevant Some embodiments may opt to categorize according to probable pragmatic intent[82510] instead or in addition. For example, posting a photograph of a terrorist act can have one of several very different pragmatic intents[82510]: to boast, to threaten, to condemn, to warn, or to sympathize. Otherwise put, different events can hold very different—and indeed opposite—meaning for different people. This is one of the reasons that some embodiments will choose to have an evidence link[39600] type for imputed image sentiment[350000] and/or pragmatic intent[82510].

The problem of imputing sentiment[350000] or pragmatic intent[82510]: is not an entirely trivial one. For example, performing sentiment analysis on text in the post[34105] that accompanies the image[72000] or even any posts[34105] by the same author[34106] within a certain time window[100500] may yield nothing of any value; in fact there may be no such text, period. This is because the context often obviates the need for any overt expression of either sentiment or pragmatic intent[82510]. And because certain platforms such as Instagram are image-rather than text-centric. Most embodiments will factor in types of context that include, but are not limited to, the following:

Any text by the author/poster[34106] that accompanies the image[72000], or is posted with a configurable time window[100500] or alternately "burst"[71250] around the posting. In some embodiments, this will include posts[34105] concurrent in time on media or forums[34110] other than the one in which the image[72000] being analyzed was posted.

Any text whose pragmatic intent[82510] is to respond to the image[72000] or posts[34105] (text) associated with the image[72000]. This is medium-dependent. (e.g. on Twitter, a retweet.)

Prior posts[34105] by the poster going back for a preset period of time, but generally at least months or years. Some embodiments will allow the aggregation of identities[70010] or accounts[34102] that are considered to be associated with the same human user.

Subsequent posts, since most embodiments will allow for updates.

The collection of all posts[34105] from the union of any communities (in a graph-theoretic sense) over a preset period of time. (In most embodiments, a separate parameter will be provided for how far to go back in time for each class of actor[71000]. However, longer periods of time will be preferred by almost all embodiments. In many embodiments, graph computations[20050] such as for communities, social proximity, nearest neighbors etc. will be performed multiple times when there is data going back for a long time. This is to avoid missing out on detecting interesting structures in the graph that don't persist over long periods of time. This is a case that is not so uncommon in certain domains, for example, terrorists may be disappear from the network due to death or imprisonment. Most embodiments will offer a choice between recalculating based on partitioning the data into active time-based windows[100500], and activity-based partitions.

The collection of all posts[34105] from the set of nearest neighbors, likewise

The orientation[5007] of the forum[34110] on which the image[72000] instance was posted, if any. For example, an image[72000] of the Twin Towers falling on 9/11 posted on a known jihadist forum[34110] does not require disambiguation of the poster's intent[82510]. (Orientation[5007] information for relevant forums[34110] will be stored in the knowledgebase[30000] in most embodiments; new forums[34110] may be identified and added over time as copies and relatives of an image are found on them with broad-based image search. Other embodiments may try to determine orientation[5007] on the fly by performing sentiment analysis on a sample of the content. Orientation[5007] will generally be assessed at the lowest possible level such as the particular newsgroup, channel, etc.)

Similarly, the orientation[5007] of any other forum [34110] in which the actor[71000] (or, in some embodiments, any account believed or known to be associated with that actor[71000],) has participated. Some embodiments may offer specific definitions for what rises to the bar of "participation."

Likewise, the orientation[5007] of other forums[34110] in which actors[71000] proximate to the current actor [71000] according to any SNA calculations used by the particular embodiment.

The set of posts[34105] of any actors[71000] who have posted the same image[72000] or member of the same image family[180040] in any leaf-level forum which has been identified in one of the above searches. Otherwise put, this is to sweep up any actors[71000] who run in the same circles, but may not be closely connected to the original actor[71000] in question.

Figure 11:
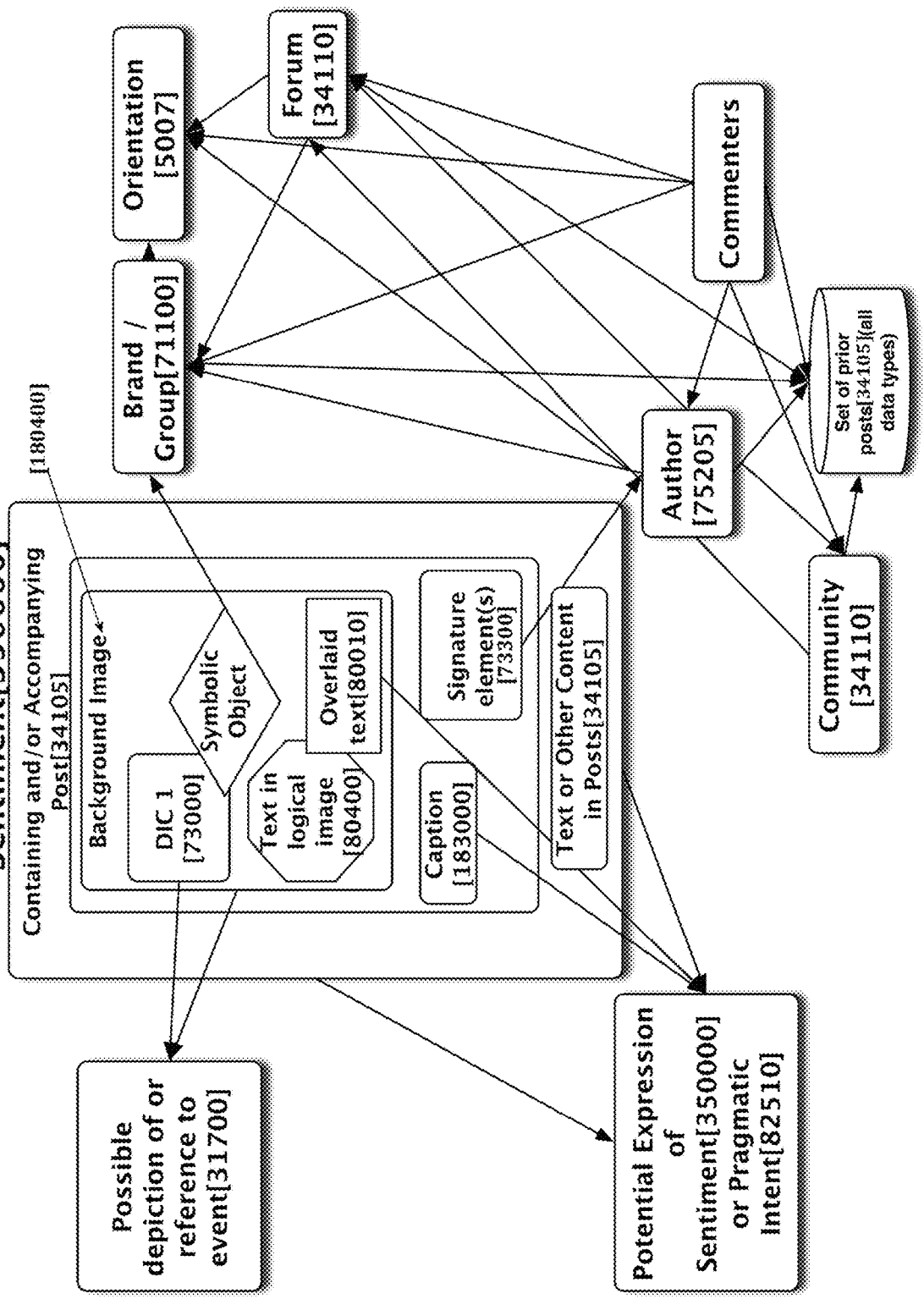
FIG. 11 is a block diagram which illustrates the sources of imputed image sentiment.

These are illustrated in FIG. 11.

Different embodiments may prefer to avail themselves of different sentiment analysis techniques on the assembled data sets, as well as resolving cases in which there is a mixture of results among the different contexts (e.g. weighted voting, one-vote-per-method, having user intervention if there is less than N % agreement among the different methods, etc.). Some embodiments will also opt to perform topic analysis as well. It should be noted that almost all embodiments will keep the contexts it examines centered around the particular posting of an image instance[72000]. In other words, even if the exact same image[72000] is posted in many other forums[34110], by many other actors [71000], there will be a requirement for attributing sentiment[350000] or pragmatic intent[82510] that there been some linkage to the particular actor[71000] or the particular forum[34110]. This is to avoid cases in which very different groups of people use the same image[72000] in very different contexts. In such cases, while the image[72000] may be the same, there are no constraints on the possible sentiments or pragmatic intents[82510].

In most cases, the sentiment or pragmatic intent[82510] category that is identified in different contexts will be quite homogeneous, which is to say related sentiments (e.g. worried or fearful) or pragmatic intent[82510] (boasting or threatening) or else null. However, since sentiment detection is inherently an imperfect thing, some divergence here and there can be expected due to miscategorization. Nonetheless, most embodiments will flag cases in which the sentiments [350000] or pragmatic intents[82510] have apparently changed over time. This is to account for the odd case in which an individual[71000] (or even a group[71100]) in fact does change their ideology. In such cases, the sentiment [350000] or pragmatic intent[82510] that can be inferred from recent posts[34105] will be assigned, or a human analyst[50310] must decide how to categorize, based on the system configuration.

In cases of a container image with multiple DIC's[73000], most embodiments will perform the computations on each DIC [73000] independently as well as the container image. In most embodiments, each DIC[73000] (as well as the container image) will be assigned a coarse-grained polarity of positive, negative, or null so as to avoid getting entangled in having to resolve differences among subtly different sentiments[350000] or intents[82510]. In situations in which there are mixed actual polarities—nulls will be discounted altogether—many embodiments will more highly weight the polarity of the DIC's[73000] are the least commonly found outside the actor[71000] neighborhood and associated forums[34110].

Some embodiments will similarly expand the analysis of context to any image[72000] (and any contained DIC's [73000]) that is posted in the same thread, same leaf-level forum within a user-set interval of time, is posted in, or referred to in a response to the post[34105] that contained image[72000] or other programmatically definable set.

Of course, many images[72000] will not be mappable to a recognizable historical, news or similar event[31700]. An image[72000] may reference a very obscure or personal event—or no discernible event at all (e.g. someone taking a picture of their cat.) In most such cases, the image[72000] is less likely to be widely disseminated; comments on it are far likelier to be about properties of the literal image[72000] (e.g. an especially beautiful sunset) than about an abstract concept for which the image serves as a proxy.

Nonetheless, many embodiments may still decide to input at least sentiment[350000] to images[72000] that have no association to a recognizable event using the same techniques to the extent possible. One rationale for doing so is to identify potential cases in which an image[72000] is serving as a proxy for an event or concept of interest (as evidenced by a combination of unusual transmission paths and/or speed, sentiment expression and/or topic mentions)

It should be noted that imputed sentiment can be derived in an analogous way for other types of content besides images.

Measures[90000] & Countermeasures[100000]

Each state actor[71000] is presumably fully aware of the details of its own countermeasures[100000]- and can also often make educated guesses about those of both its allies and its adversaries. This data can be inputted to the system to set measure→countermeasure time windows[100500], but also to provide specific "hints" to the system. To take a simple example, if the just-deployed countermeasure [100000] involved the identification and flagging of embedded lion images[72000], the system would receive a "hint" to expect to see fewer such lions—or else more cleverly cloaked lions—in images[72000] in future from the groups [71100] being monitored. However, it might also (for example,) based on prior experience, then expect to start seeing more lions (or lion references) showing up in videos [72000], and so be looking for such—even if the numbers are not significant initially.

The latter information is helpful in quickly recognizing a new measure[90000] or countermeasure[100000] once it has been deployed in a particular geographical zone[100800]. For example, even without the certain knowledge that a good lion feature detector has been deployed, inferences can be made that that is what has occurred if there is a clearly observable fall-off in the number of obvious lions observed in images[72000] on public forums[34110], especially if that fall-off does not occur in all jurisdictions[41000] at the same or similar time.

Note that most embodiments in addition to jurisdictional zones[41000] will allow other types of zones[100800] such as linguistic or cultural ones to be defined. This is because, for example, if a particular countermeasure[100000] is enacted by the French government, it will surely impact those posting content within French territory. It will to a lesser degree impact francophone posters residing outside of French territory. While such posters cannot be arrested as easily, persons residing in French territory who are consuming their content will get on the radar of local authorities.

Continuing on with the lion example, the use of obvious lion images is likely to fall off faster in posts originating from within French territory than those originating outside of it. Thus allowing different, overlapping zones[100800] has utility.

The characteristics of the fall-off within a given group [71100] in a given region are interesting information in and of themselves. News of detainments or arrests—or new orders in the case of a state or quasi-state actor[71000]—may travel quickly, but is nonetheless very unlikely to be received (or new measures implemented) at the exact same moment in time by all members of an extended and geographically distributed group[711 00]. As a result, most embodiments will assume a steep fall off of a given feature in the face of an aggressive countermeasure[10000], but will not assume that the feature in question morphs or disappears entirely within hours or days of arrests or similar "tell" actions. Indeed, a preferred embodiment observes over time what the shape of the decay curve is in a particular region for a particular group[71100], with a bias towards recent data (since for example uses of new technology can cut down on the time it takes to transmit warnings within the group [71100].) In fact, the shape of this decay curve in a given region in some embodiments is considered probable evidence of the application of a countermeasure[100000].

Figure 12:
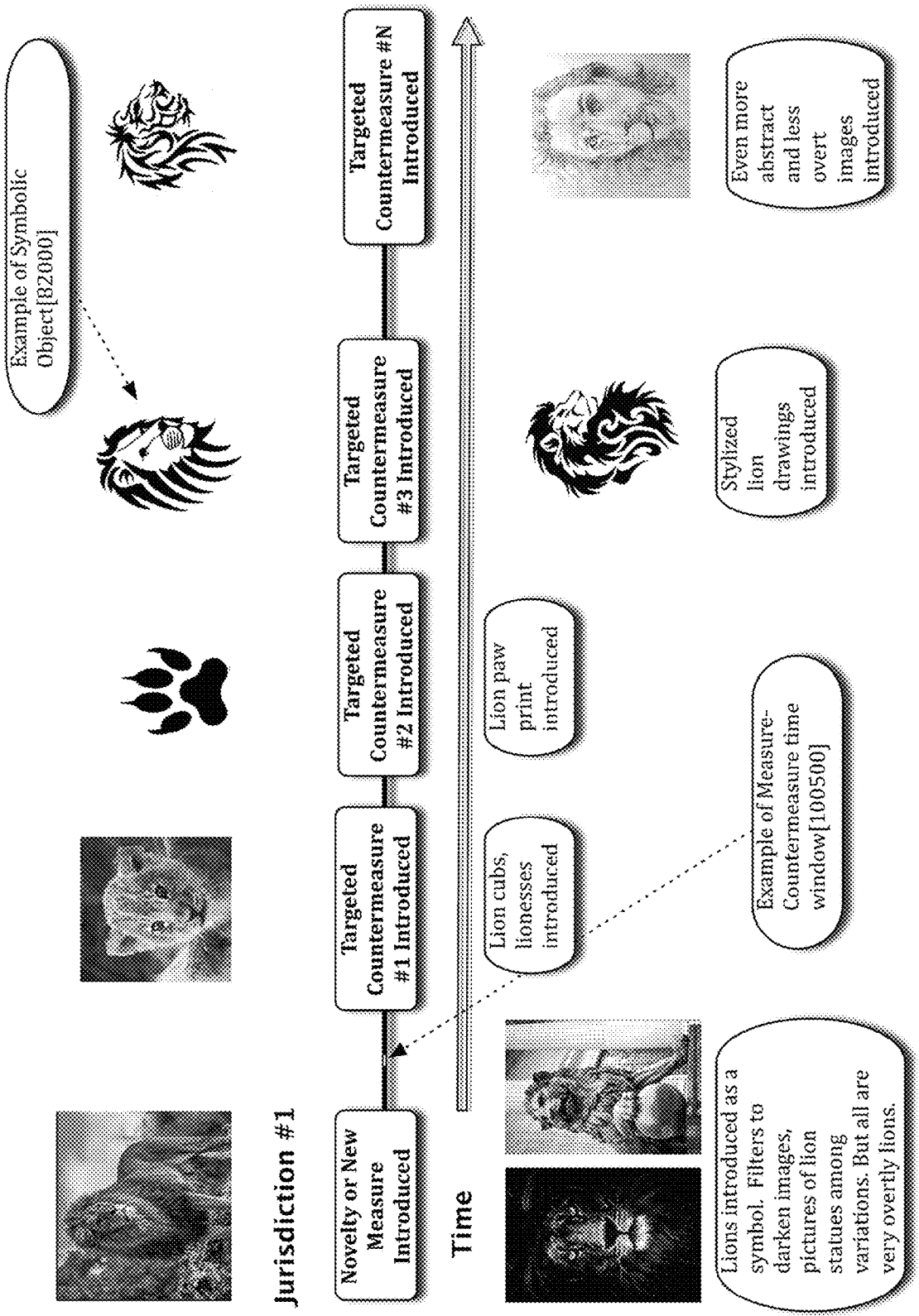
FIG. 12 is a diagram which illustrates an example of measure/countermeasure pairs.

Because each jurisdiction[41000] offers a new opportunity to observe behavior, lessons learned from one jurisdiction[41000] can be applied to another. At least some differences in measures[90000] and countermeasures[100000] are likely from one jurisdiction[41000] to another, even if they mostly involve timing. Also, the technical proficiency and access to sophisticated technology of the entities involved will impact behavior. Even so, the types of transformations [73014] or alterations can often be generalized across regions[41000]. FIG. 12 offers an example of this.

It should be noted that it is nearly as important for the system[100] to be aware of countermeasures[100000] as it is of measures[90000] (which are tantamount to features. [72100]) This is because most embodiments will find it useful to decrement the weight of relevant evidence links [39600] to analyze content within a brief time interval [100500] after the application of a countermeasure[100000]. The length of the interval[100500] may be empirically determined based on prior observations in the given jurisdiction[41000] or else can be assigned a fixed value. Similarly, some embodiments may opt to adjust or partially retrain the deep learning component[10000] subsequent to the application of a countermeasure[100000]. Otherwise put, it is counterproductive to seek the proverbial (or literal) lion image[72000] in a given jurisdiction[41000] if there is excellent reason to believe that it will largely disappear.

Managing Evidence By Jurisdiction[41000]

Most embodiments will include a mechanism to accommodate relevant legal restrictions in a given jurisdiction [41000], in particular to ensure that the requisite burden of proof is met before identifying a particular individual as being a probable bad actor[71000]- and to ensure that only legally permissible evidence links (e.g. features) and raw evidence have been used to identify the individuals in question. This will generally be implemented as a filter that must be defined per jurisdiction[41000]. In most embodiments, this information will be stored in the knowledge model [26000].

Specifically, in most embodiments, the relevant neighborhoods of the graph will be recomputed on demand, when a query is made about one or more particular actors[71000] (who are subject to one or potentially more jurisdictions [41000]) by a user who is likewise. Such on-the-fly computation[20050] is needed in order to avoid combinatorics of different jurisdictions[41000]. Importantly however, in the event that there is more than one applicable non-null jurisdiction filter needed for a given query, the computation for each jurisdiction[41000] is done separately. This is because the great strength of a multi-evidence model is that results are arrived at based on many different kinds of evidence. Thus the "right" real world result may still be achievable in the event that certain type(s) of evidence are verboten. However, were the filters to be applied additively, it would increase the probability that the same result could be arrived at. In the user interface and system logs, users will only see the supporting evidence that they are allowed to see based on their user credentials, which are in turn constrained by the rules of the governing jurisdiction(s.)[41000]

Figure 14:
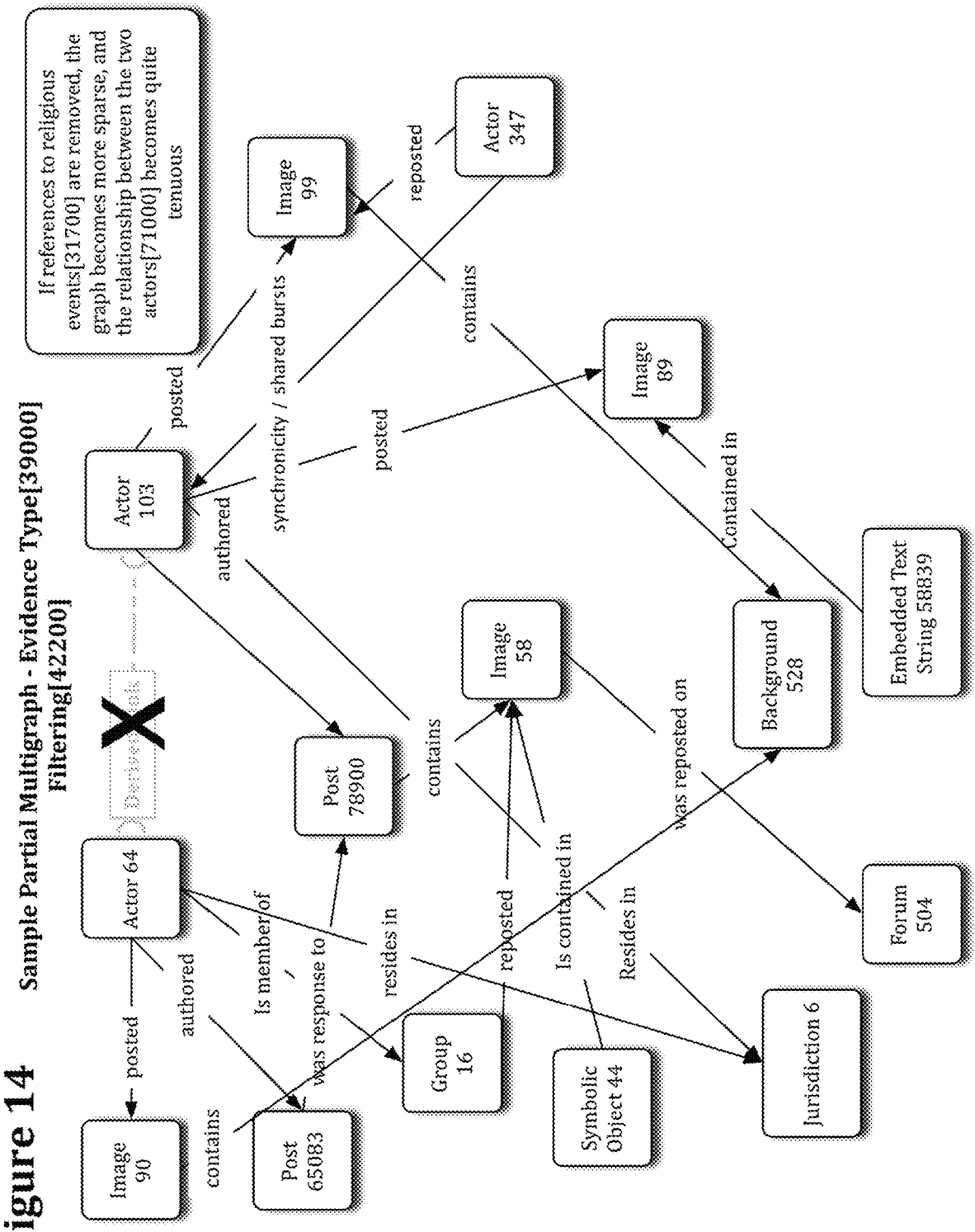
FIG. 14 is a block diagram which illustrates a sample partial multigraph—evidence type filtering.

To take a concrete example, viewing and distribution of Salafist content may not be sufficient even to initiate surveillance in some jurisdictions[41000], even if the textual content matches exactly with known terrorist content and is unambiguous; such jurisdiction[41000] might protect such behavior under the heading of religious freedom. (Many jihadists may be Salafists, but most Salafists are not jihadist.) A very small example of the impact of filtering[42200] such evidence[39000] can be seen in FIGS. 13 and 14.

User Interface[70000]

The user interface[70000] in most embodiments allows users to provide training, updated information, and other feedback on a variety of objects including, but not limited to: actors[71000], identities[70010], groups[71100], measures [90000], countermeasures[100000], images[72000], image components[400000], image[72100] or meta-data[34900], including features[73000] related to a post[34105] or other object that includes an image or is associated with one [20100]. The ability to inject feedback for training and/or other improvement against a variety of object types in a model[26000] should help elicit richer user interaction which in turn should improve the results.

To this end, most variations of the UI[70000] will allow users to select instances of any of the object types supported by the system[100]; further types may be added by adding them to the knowledgebase[30000]. Once an instance is selected, all derived[20100] and direct features[73000] about that instance will be displayed for which that user has permission. This includes relationships to other objects. For example, if an actor[71000]/author[75205] is selected, links to access information about closest actors[71000] under different measures will be displayed in both list and graph form.

Most embodiments will allow users to browse relevant image forests[25200] by dragging and dropping or otherwise specifying an image[72000] onto the window that contains the canvas object displaying the forest graph[25200]. Most embodiments will also offer a multigraph display that has both actors[71000] and images[72000] as nodes that are linked together by the different actions that an actor[71000] can take upon an image[72000] (e.g. post, approve, "like", retweet, comment upon, repost, etc.) Many of these embodiments will have the ability to roll up both actors[71000] to affiliated groups[71100] and images[72000] to their set of trees in the forest[25200] so as to have a more compact graph[25200].

Figure 15:
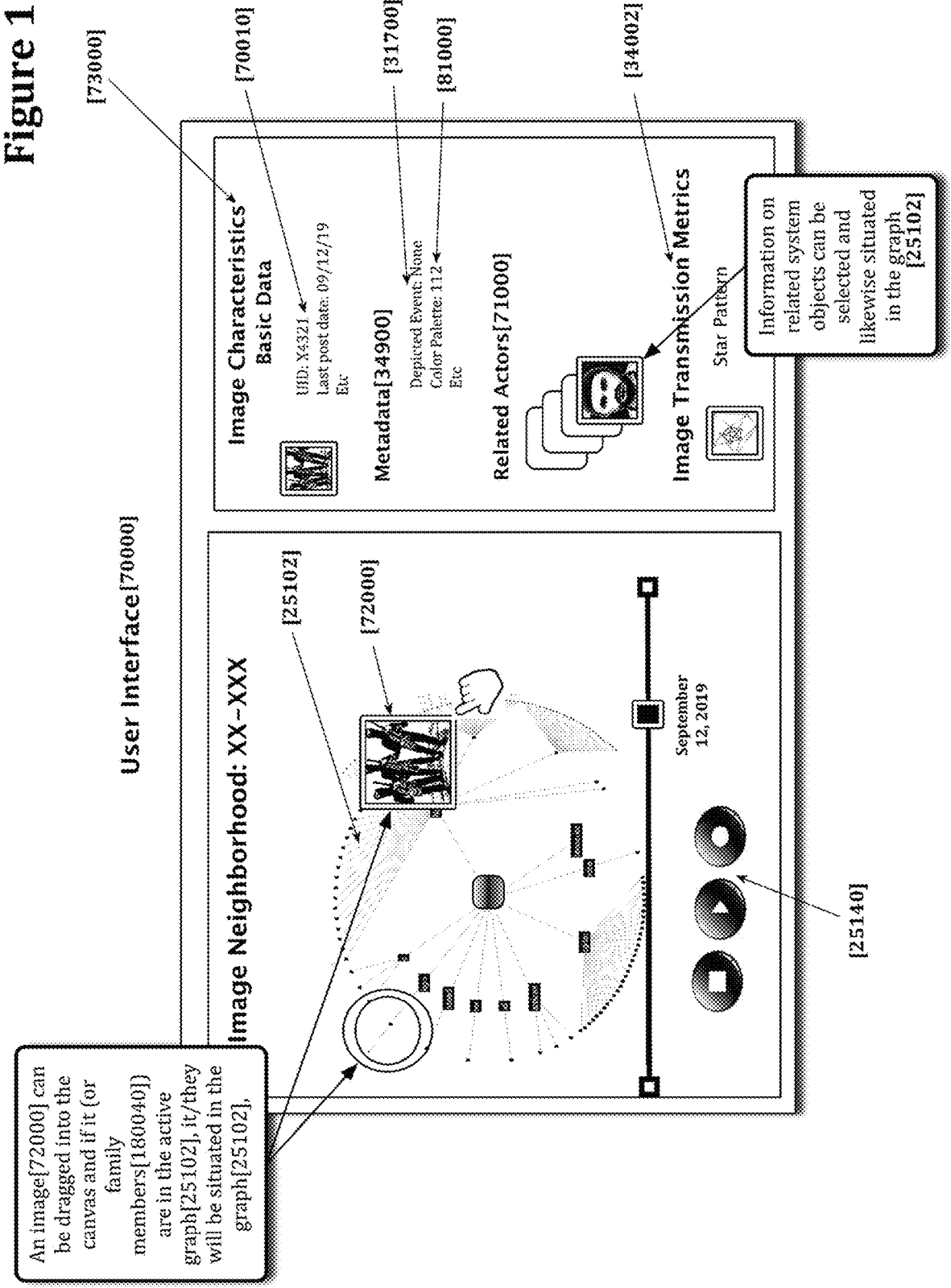
FIG. 15 is a diagram which illustrates a User Interface for the system.

Most embodiments will also allow any graph[25200] display to be "played"[25140] so that changes over time can be highlighted. Examples include, but are not limited to: some links[25210] might become thicker and composed of more different link types (which can be depicted with different stroke colors or styles,) actors[71000] may move closer or farther away from one another, or sections of the image forest[25200] may greatly expand. Most embodiments will also allow users to select multiple actors[71000] and/or images[72000] and drag them onto a canvas to query the system for any known or probable overlap or intersection among all of them or any subset of them. FIG. 15 is a sketch of the UL.

The invention claimed is:

1. A non-transient computer readable medium for causing a computer to perform a method of:
   allowing the computer to receive at least one electronic media communication data set from an electronic medium, wherein the at least one communication data set is comprised of at least one element selected from a group of text, image, video, and audio;
   computing the at least one data set with an analytics engine;
   applying to the at least one data set at least one individual feature attribute selected from a group of image transformations, direct image component reuse, logical image component reuse, event being referenced, symbolic object presence, linguistic properties, contextual font legibility, cultural, religious, linguistic or jurisdictional zone, transmission properties, measure-countermeasure window, visual style, connotation, color palette properties, stylization level, provenance, sentiment, pragmatic intent, author, actor or group who posted, actor who commented, properties of these actors or groups, forums of postings;
   contrasting feature sets of different data items to create distinct groupings; and
   predicting changes to content that are likely to occur in response to targeted countermeasures using machine learning and in reverse to identify that a countermeasure has been applied.

2. The computer readable medium of claim 1, further comprising presenting conclusions with the analytics engine in a form selected from a group of node depiction of geographic relationships, node depiction of significance of connections over time, transmission of data memes, and identifying and tracking logical image components.

3. The computer readable medium of claim 1, wherein attribute values are re-evaluated after meeting a condition selected from a group of actor data record update, group record update, geographic transmission property update, symbolic object update, other logical image component, and direct image component update.

4. The computer readable medium of claim 1, wherein a deep learning component is used to detect subtle branding features and correlations in the data set.

5. The computer readable medium of claim 1, further comprising applying an inferencing engine to the selected data, wherein the inferencing engine allows knowledge from prior countermeasure experience to be applied and specific policies as required by one or more rule sets as required by one or more jurisdictions to be enforced.

6. The computer readable medium of claim 1, further comprising one or more specialized computational components to derive highly specific features including legibility of text superimposed on a particular background in an image, to characterize a color palette, to identify an application of specific filters and other transformations, lexical fingerprinting, deception theory application, and image ancestry tree construction.

7. The computer readable medium of claim 1, further comprising a hypergraph analysis that creates a nodal expression with evidence link types that identify information selected from a group of identity of actors, properties of actors, properties of groups of actors, content of interest, communications of interest and their properties, composition of a group of actors, attributes of transformation, direct image components and their properties.

8. The computer readable medium of claim 1, further comprising identifying in selected data characteristics selected from a group of appearance and semantic characteristics of any text embedded in the image, appearance and semantic characteristics of any text overlaid on the image, characteristics of textual comments concerning the image within distinct communities of actors operating on the image, presence of representations of specific real world objects, reference to an at least one event, color palette similarity, characteristics of an at least one actors that performs some discrete action related to selected electronic communication, presence of an identifying origin identifier, characteristics of any related images, characteristics of direct image components, characteristics of forums or media where the image is posted, presentation style, specific transformations, logical image components, transmission characteristics, and frequency of removal from communication forums.

9. The computer readable medium of claim 1, further comprising a knowledgebase used by an inferencing component, wherein the knowledgebase contains information about objects selected from a group of measure and countermeasure windows in different jurisdictions, zone information, events of significance in different zones and associated sets of sentiments and pragmatic intents, symbolic use of objects, actors of interest and their properties, groups of interest, forums of interest, relevant topics, orientation, transmission characteristics, and metric knowledge objects.

10. The computer readable medium of claim 1, further comprising a knowledgebase that stores known real world information.

11. The computer readable medium of claim 10, wherein the knowledgebase is extrinsic to the data set in a system.

12. The computer readable medium of claim 1, further comprising filtering out, with the analytics engine, at least one type of evidence link in hypergraph, so as to have legal evidence in each jurisdiction.

13. The computer readable medium of claim 1, further comprising imputing sentiment of distinct communities of users in relation to an at least one communication format selected from a group of image, video, text, and sound, where selection incorporate evaluation of each of following contexts: caption in image, text in containing or accompanying post, text superimposed on an image body or inserted in a direct image component, text obtained from speech-to-text, properties of actors, groups and communities reacting to communication, properties of posts relating to the communication, properties of other posts of the actors more generally both previous and subsequent, and properties of forum of an original posting.

14. The computer readable medium of claim 1, further comprising detecting transformations of or on logical image components in order to overcome limitations of both inferencing and deep learning systems so as to be able to better predict the changes to the content that are likely to occur in the response to the targeted countermeasures and in the reverse to the identify that the countermeasure has been applied.

15. The computer readable medium of claim 1, further comprising performing graph calculations so as to minimize an amount of change that relates to recurring image components.

* * * * *